United States Patent
Varghese et al.

(10) Patent No.: US 8,620,718 B2
(45) Date of Patent: Dec. 31, 2013

(54) INDUSTRY SPECIFIC BRAND BENCHMARKING SYSTEM BASED ON SOCIAL MEDIA STRENGTH OF A BRAND

(75) Inventors: Joseph Varghese, Mundelein, IL (US); Kumaravel Krishnasami, Coimbatore (IN); Lakshmanan Narayan, Chennai (IN)

(73) Assignee: Unmetric Inc., Mundelein, IL (US)

( * ) Notice: Subject to any disclaimer, the term of this patent is extended or adjusted under 35 U.S.C. 154(b) by 0 days.

(21) Appl. No.: 13/587,928

(22) Filed: Aug. 17, 2012

(65) Prior Publication Data
US 2013/0325550 A1 Dec. 5, 2013

(30) Foreign Application Priority Data
Apr. 6, 2012 (IN) .............. 2232/CHE/2010

(51) Int. Cl.
*G06Q 10/00* (2012.01)
*G06Q 30/00* (2012.01)

(52) U.S. Cl.
USPC ........................................ 705/7.29

(58) Field of Classification Search
USPC ........................................ 705/7.29
See application file for complete search history.

(56) References Cited

U.S. PATENT DOCUMENTS

| | | | |
|---|---|---|---|
| 6,983,320 B1* | 1/2006 | Thomas et al. | 709/224 |
| 7,974,983 B2* | 7/2011 | Goeldi | 707/769 |
| 8,117,207 B2* | 2/2012 | Mushtaq et al. | 707/748 |
| 8,271,507 B2* | 9/2012 | Farmer | 707/756 |
| 8,311,874 B2* | 11/2012 | Gupta et al. | 705/7.29 |
| 8,312,056 B1* | 11/2012 | Peng et al. | 707/802 |
| 2006/0069589 A1 | 3/2006 | Nigam et al. | |
| 2008/0033776 A1* | 2/2008 | Marchese | 705/8 |
| 2008/0183552 A1* | 7/2008 | O'Hagan | 705/10 |
| 2008/0215417 A1* | 9/2008 | Young | 705/10 |
| 2008/0216018 A1* | 9/2008 | Kelly | 715/835 |
| 2008/0270203 A1* | 10/2008 | Holmes et al. | 705/7 |

(Continued)

FOREIGN PATENT DOCUMENTS

WO  WO2010116371 A1  10/2010

OTHER PUBLICATIONS

Spanger, Scott et al., Multi-Taxonomy: Determining Perceived Brand Characteristics from Web Data 2008 IEEE/WIC/ACM International Conference on Web Intelligence and Intelligent Agent Technology, 2008.*

(Continued)

*Primary Examiner* — Scott L Jarrett
(74) *Attorney, Agent, or Firm* — Ash Tankha; Lipton, Weinberger & Husick

(57) ABSTRACT

A brand monitoring platform (BMP) for brand benchmarking based on a brand's social media strength is provided. The BMP acquires input information on the brand and identifies industries related to the brand and competing brands. The BMP acquires social media information related to the brand and the competing brands from multiple social media sources via a network, dynamically generates categories in one or more hierarchical levels in each of the industries based on an independent analysis of the social media information, and sorts the social media information into the categories using a sorting interface. The BMP generates an aggregate score using an audience score determined by measuring an aggregate reach of the brand and the competing brands based on weighted audience score metric parameters, and an engagement score determined by measuring interaction between the brand and the competing brands and their followers based on weighted engagement score metric parameters.

26 Claims, 22 Drawing Sheets

(56) References Cited

U.S. PATENT DOCUMENTS

| | | | |
|---|---|---|---|
| 2008/0288331 A1* | 11/2008 | Magids et al. | 705/10 |
| 2009/0048904 A1 | 2/2009 | Newton et al. | |
| 2009/0222551 A1 | 9/2009 | Neely et al. | |
| 2009/0265332 A1* | 10/2009 | Mushtaq et al. | 707/5 |
| 2009/0281870 A1* | 11/2009 | Sun et al. | 705/10 |
| 2010/0042503 A1* | 2/2010 | Farmer | 705/14.72 |
| 2010/0119053 A1* | 5/2010 | Goeldi | 379/265.09 |
| 2010/0121707 A1* | 5/2010 | Goeldi | 705/14.49 |
| 2010/0121843 A1* | 5/2010 | Goeldi | 707/722 |
| 2010/0121849 A1* | 5/2010 | Goeldi | 707/736 |
| 2010/0153848 A1 | 6/2010 | Saha | |
| 2010/0228812 A1 | 9/2010 | Uomini | |
| 2010/0293170 A1 | 11/2010 | Hall et al. | |
| 2010/0325107 A1 | 12/2010 | Kenton et al. | |
| 2011/0004483 A1* | 1/2011 | Ting et al. | 705/1.1 |
| 2011/0173264 A1 | 7/2011 | Kelly | |
| 2011/0179114 A1 | 7/2011 | Dilip et al. | |
| 2011/0191417 A1* | 8/2011 | Rathod | 709/204 |
| 2012/0158476 A1* | 6/2012 | Neystadt et al. | 705/14.16 |
| 2012/0246054 A1* | 9/2012 | Sastri | 705/37 |
| 2012/0246104 A1* | 9/2012 | Di Sciullo et al. | 706/46 |
| 2012/0290446 A1* | 11/2012 | England et al. | 705/27.1 |
| 2012/0296845 A1* | 11/2012 | Andrews et al. | 705/36 R |

OTHER PUBLICATIONS

Spanger, Scott et al., COBRA—Mining Web for COrporate Brand and Reputation Analysys IEEE/WIC/ACM International Conference on Web Intelligence, 2007.*

Gilbert, Frederic et al., Communities and hierarchical structures in dynamic social networks: analysis and visualization Social Netwrk Analysis and Mining, vol. 1, No. 2, 2010.*

Godbloe, Namrata et al., Large-Scale Sentiment Analysis for News and Blogs ICWSM'07, 2007.*

Liu, Bing, Opinion Mining & Summarization—Sentiment Analysis WWW-2008, Apr. 21, 2008.*

Benchmark Report—2011 Social Marketing MarketingSherpa, Except, 2011.*

Leading Brands and the Modern Social Media Landscape—The 2010 FedEx/Ketchum Social Media Benchmarking Study, 2010.*

2010 Social Media Marketing Benchmarket Report (Excerpt) MarketingSherpa, 2010.*

Dave, Kushal et al., Mining the Peanut Gallery: Opinoin Extraction and Semantic Classifcation of Product Reviews WWW2003, ACM, May 20-24, 2003.*

Buzzient, Social Media Integration for Enterprise Application Buzzient, 2011.*

Buzzient Enterprise for CRM On Demand Buzzient, 2011.*

Unmetric Tool Offers Social Media Benchmarking Daily Research News Online, Sep. 9, 2011.*

Naidu, Prasant, Unmetric—Facebook Fan Page Analytics Review Lighthouse Insights, Sep. 27, 2011.*

Unmetric.com—Web Page Unmetric, May 20, 2011, Retrieved from Archive.org Aug. 27, 2013.*

SAS Social Media Analytics—Factsheet SAS, Inc., 2011.*

Socialagility—Top 50—The social performance of the world's most valuable brands Socialagility, 2011.*

VisibleTechnologies.com Web Pages Visible Technologies, Jun. 25, 2011, Retrieved from Archive.org Aug. 27, 2013.*

Etlinger, Susan et al., A Framework for Social Analytics Altimeter Group, Aug. 10, 2011.*

* cited by examiner

| BRAND NAME | NUMBER OF FANS | FAN WEIGHT | FAN GROWTH | FAN GROWTH WEIGHT | AUDIENCE SCORE |
|---|---|---|---|---|---|
| Chase Community Giving | 3376408 | 536 | 36444 | 56 | 416 |
| American Express | 2350075 | 498 | 33623 | 62 | 389 |
| Capital One | 2499070 | 505 | -11798 | -15 | 375 |
| Axis Bank | 419319 | 260 | 174686 | 360 | 285 |
| IDBI Bank | 161184 | 178 | 75209 | 397 | 233 |
| Frank by OCBC | 14201 | 93 | 4319 | 284 | 80 |
| Citibank India | 301137 | 226 | 54103 | 205 | 221 |
| Chase Freedom | 480475 | 275 | 3913 | 50 | 219 |
| Reliance Mutual Fund | 265024 | 215 | 32201 | 166 | 203 |

FIG. 10A

| BRAND NAME | ENGAGEMENT NUMBER | ENGAGEMENT NUMBER WEIGHT | NUMBER OF ADMIN POSTS | ADMIN POSTS WEIGHT | % OF FAN POSTS | FAN POST % WEIGHT | NET SENTIMENT % | NET SENTIMENT WEIGHT | "TALKING ABOUT" WEIGHT | ENGAGEMENT SCORE |
|---|---|---|---|---|---|---|---|---|---|---|
| Chase Community Giving | 6 | 61 | 112 | 100 | 0.00 | -20 | 0.31 | 104 | 0 | 65 |
| American Express | 7 | 111 | 96 | 26 | 0.00 | -20 | 0.36 | 75 | 0 | 69 |
| Capital One | 7 | 64 | 136 | 129 | 0.00 | -20 | 0.52 | 200 | 0 | 83 |
| Axis Bank | 39 | 202 | 274 | 171 | 0.72 | 253 | 0.27 | 49 | 0 | 161 |
| IDBI Bank | 40 | 206 | 143 | 72 | 0.00 | -20 | 0.48 | 120 | 0 | 132 |
| Frank by OCBC | 157 | 609 | 364 | 239 | 0.44 | 146 | 0.25 | 43 | 0 | 376 |
| Citibank India | 17 | 113 | 278 | 174 | 0.00 | -19 | 0.43 | 103 | 0 | 109 |
| Chase Freedom | 20 | 100 | 108 | 95 | 0.00 | -20 | 0.65 | 258 | 0 | 98 |
| Reliance Mutual Fund | 9 | 81 | 159 | 84 | 0.71 | 248 | 0.30 | 60 | 0 | 80 |

FIG. 10B

| BRAND_ID | BRAND NAME | AUDIENCE SCORE | NORMALIZED AUDIENCE SCORE | NORMALIZED AUDIENCE SCORE RANK | ENGAGEMENT SCORE | NORMALIZED ENGAGEMENT SCORE (NES) | NES RANK | AGGREGATE SCORE | NORMALIZED AGGREGATE SCORE | BRAND RANK |
|---|---|---|---|---|---|---|---|---|---|---|
| 1097 | Chase Community Giving | 416 | 516 | 62 | 65 | 66 | 14 | 323 | 100 | 1 |
| 21 | American Express | 389 | 482 | 61 | 69 | 70 | 16 | 303 | 94 | 2 |
| 25 | Capital One | 375 | 465 | 60 | 83 | 85 | 23 | 296 | 93 | 3 |
| 1109 | Axis Bank | 285 | 353 | 58 | 161 | 165 | 54 | 245 | 82 | 4 |
| 1118 | IDBI Bank | 233 | 288 | 57 | 132 | 135 | 49 | 200 | 67 | 5 |
| 537 | Frank by OCBC | 80 | 99 | 31 | 376 | 384 | 62 | 136 | 63 | 6 |
| 177 | Citibank India | 221 | 274 | 56 | 109 | 112 | 38 | 187 | 62 | 7 |
| 1114 | Chase Freedom | 219 | 272 | 55 | 98 | 101 | 33 | 183 | 60 | 8 |
| 1023 | Reliance Mutual Fund | 203 | 251 | 54 | 80 | 82 | 20 | 167 | 54 | 9 |

FIG. 10C

| | | |
|---|---|---|
| | AGGREGATE SCORES IN THE [AVIATION ▶] SECTOR FOR [APRIL 2012 ▶] | |
| | FILTER BY [ALL GEOGRAPHIES ▶] PAGES WITH "WORLDWIDE" FOCUS ARE INCLUDED IN ALL SELECTIONS | |
| 100 |  KLM | LIKES: 1,524,252-14,288(IN LAST 7DAYS)<br>GEO FOCUS: EUROPE |
| 94 |  LUFTHANSA | LIKES: 1,097,894-11,108(IN LAST 7DAYS)<br>GEO FOCUS: EUROPE |
| 91 |  TURKISH AIRLINES | LIKES: 689,139 - 43,757(IN LAST 7DAYS)<br>GEO FOCUS: EUROPE |
| 86 |  AIR FRANCE | LIKES: 770,644-2,217(IN LAST 7DAYS)<br>GEO FOCUS: FRANCE |
| 85 |  SOUTHWEST AIRLINES | LIKES: 2,337,937-28,855(IN LAST 7DAYS)<br>GEO FOCUS: USA |
| 79 |  JET AIRWAYS | LIKES: 678,334-18,234(IN LAST 7DAYS)<br>GEO FOCUS: INDIA |

FIG. 11A

TOP BRANDS IN THE FOOD/BEVERAGE SECTOR

FILTER BY: ALL GEOGRAPHIES ▶    NOTE: BY DEFAULT PAGES WITH A WORLDWIDE FOCUS ARE INCLUDED IN ALL SELECTIONS

◀ | ≡ |                                                                                    ▶  ▶

| 100 | Red Bull       | RED BULL   | LIKES: 28,197,159 GEO FOCUS: WORLDWIDE |
| 98  | Coca-Cola      | COCA-COLA  | LIKES: 42,018,605 GEO FOCUS: WORLDWIDE |
| 91  | OREO           | OREO       | LIKES: 26,468,339 GEO FOCUS: WORLDWIDE |
| 87  | INTRODUCIN IT'S NOT R | DR. PEPPER | LIKES: 11,887,725 GEO FOCUS: WORLDWIDE |
| 85  | Pringles       | PRINGLES   | LIKES: 19,351,144 GEO FOCUS: WORLDWIDE |
| 84  | nutella        | NUTELLA    | LIKES: 15,398,585 GEO FOCUS: WORLDWIDE |

APRIL 2012 ▶

THESE SCORES ARE THE AGGREGATE SCORES (FROM APRIL 2012). YOU COULD ALSO CHECK OUT SOME OTHER MONTH HERE

FIG. 11B

INDUSTRY SPECIFIC BRAND BENCHMARKING SYSTEM BASED ON SOCIAL MEDIA STRENGTH OF A BRAND

CROSS REFERENCE TO RELATED APPLICATIONS

This application claims the benefit of non-provisional patent application number 2232/CHE/2012 titled "Industry Specific Brand Benchmarking System Based On Social Media Strength Of A Brand", filed on Jun. 4, 2012 in the Indian Patent Office.

The specification of the above referenced non-provisional patent application is incorporated herein by reference in its entirety.

BACKGROUND

One of the factors that determines the success of a corporate organization is visibility of its brand in various media spaces. With the rapidly rising influence of social media networks, for example, such as Facebook® of Facebook, Inc., Twitter® of Twitter Inc., etc., on brand marketing, there is a need for comparing brands against their competitors to know how and where they stand among their competitors or peers in a social media space. Conventional benchmarking systems typically perform a brand comparison only based on the reach of the brand within the social media space. These conventional benchmarking systems often perform brand comparison for brands in disparate fields, unrelated industries, unrelated geographical areas, etc. A generic benchmarking system that compares brands in unrelated industries is often not useful since demographics of consumers, market forces, etc., that drive different industries are often different. Furthermore, brands in different industries, or brands concentrated in a particular geographical location often adopt different methods of social interaction. Therefore, there is a need for benchmarking brands against other brands that operate in the same social space.

Furthermore, conventional benchmarking systems do not take into account differences arising due to variations in geographical locations of the brand. Therefore, when a conventional benchmarking system generates benchmark scores for an entire industry, systemic high scores received by a brand in a particular geographical location often overpower systemic low scores received by the brand in another geographical location, resulting in a skewed combined industry score. For example, a brand for a cellular network provider may have a large market in a particular geographical location, and consequently a larger consumer base in that particular geographical location. Therefore, the brand may have a larger following on a social media source commonly used by consumers located in that particular geographical location. However, the brand may have to contend with multiple competing brands in a geographical location where the brand is yet to establish a sizeable market. Furthermore, consumers in the other geographical location may not be inclined to use a social media source for brand interaction. Therefore, a benchmark score generated for the brand in a particular geographical location may not be comparable with a benchmark score generated for the brand in a different geographical location.

Conventional benchmarking systems often generate a universal score that does not consider factors affected by a geographical location of the brand. Therefore, there is a need for a computer implemented method and system that benchmarks brands and generates benchmark scores specific to an industry related to the brand and its competitors and/or a geographical location at which the brands operate. Furthermore, since there is a wide variation among brands across different industries in a targeted market, demographics, brand messages, actual products, marketing strategies adopted by the brands, etc., there is a need for a computer implemented method and system that provides a focused benchmark score for a brand that is valid to a product and/or a service category for which the product and/or the service represented by the brand was developed, without comparing benchmark scores of two different industries.

Hence, there is a long felt but unresolved need for a computer implemented method and system that benchmarks a brand based on social media strength of the brand relative to other competing brands operating in the same industry and/or the same geographical location as that of the brand.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated need for benchmarking a brand based on social media strength of the brand relative to other competing brands operating in the same industry and/or the same geographical location as that of the brand. The computer implemented method and system disclosed herein provides a brand monitoring platform comprising at least one processor configured to monitor the brand in a virtual social media environment. As used herein, the term "social media strength" refers to a measure of strength of consumer reach and consumer interaction supported by a brand in a virtual social media environment. Also, as used herein, the term "virtual social media environment" refers to an environment comprising social media networks and forums that enable interaction between brand owners and/or marketers and brand followers, consumers, etc.

The brand monitoring platform acquires input information on the brand. The brand monitoring platform identifies industries related to the brand and competing brands in the identified industries using the acquired input information on the brand. The brand monitoring platform acquires social media information related to the brand and the competing brands in the identified industries from multiple social media sources in the virtual social media environment via a network. As used herein, the term "social media source" refers to an online social platform, for example, an internet forum, a blog, a social network, etc., that enables consumers, brand followers, etc., to network and access information on a brand, discuss brands, establish a brand community, communicate with brand owners and/or marketers, post responses to events or information on products and/or services related to the brands, etc.

The brand monitoring platform dynamically generates categories in one or more hierarchical levels in each of the identified industries based on an independent analysis of the acquired social media information related to the brand and the competing brands from each of the social media sources. The dynamically generated categories comprise, for example, a location of each of the identified industries related to the brand and each of the competing brands, a location of each of multiple authors of the social media information, types of social media sources utilized by the brand and each of the competing brands, marketing elements such as special discount offers, incentives, etc. In an embodiment, the brand monitoring platform determines clusters of similar content portions from the acquired social media information and identifies one or more common categories applicable to the brand and each of the competing brands in each of the identified industries from the determined clusters of similar content portions for dynamic generation of the categories.

The brand monitoring platform sorts the acquired social media information related to the brand and the competing brands in each of the identified industries into one or more of the dynamically generated categories in one or more hierarchical levels using a sorting interface provided by the brand monitoring platform. The brand monitoring platform acquires inputs configured, for example, as tags, for sorting the acquired social media information related to the brand and the competing brands in each of the identified industries into one or more of the dynamically generated categories in one or more of the hierarchical levels from a user via the sorting interface.

The brand monitoring platform determines an audience score for the brand and each of the competing brands by measuring an aggregate reach of the brand and each of the competing brands in the virtual social media environment based on one or more of multiple weighted audience score metric parameters using the sorted social media information. The weighted audience score metric parameters comprise, for example, a number of followers of the brand and each of the competing brands at each of the social media sources, a rate of growth of the number of followers of the brand and each of the competing brands, a number of recommendations for the brand and each of the competing brands at each of the social media sources from each of the followers, a number of references made to the brand and each of the competing brands at each of the social media sources by the followers, aggregate responses to products, services, and/or events associated with the brand and each of the competing brands, etc.

In an embodiment, the brand monitoring platform normalizes measures corresponding to each of the audience score metric parameters. The brand monitoring platform assigns individual weights to the audience score metric parameters. The brand monitoring platform then determines a weighted average of the normalized measures corresponding to each of the audience score metric parameters using the assigned individual weights to determine the audience score for the brand and each of the competing brands. In an embodiment, the brand monitoring platform normalizes measures corresponding to each of the weighted audience score metric parameters for reducing statistical differences between extreme measures corresponding to each of the weighted audience score parameters, and for reducing outlier data.

The brand monitoring platform determines an engagement score for the brand and each of the competing brands by measuring interaction between the brand and each of the competing brands and their corresponding followers based on one or more of multiple weighted engagement score metric parameters using the sorted social media information. The weighted engagement score metric parameters comprise, for example, nature of responses to one or more brand actions of the brand and each of the competing brands from each of the followers of the brand and each of the competing brands, a number of brand notification messages, sentiments of the followers towards the brand and each of the competing brands, a number of fan posts extracted from the acquired social media information, and relevance of the fan posts to the brand and each of the competing brands. A post is an electronic entry, for example, in the form of a text message input by a fan, a follower, a brand administrator, etc., at a social media source using a computing device. In an embodiment, the brand monitoring platform determines the engagement score for the brand and each of the competing brands by normalizing measures corresponding to each of the engagement score metric parameters, assigning individual weights to the engagement score metric parameters, and determining a weighted average of the normalized measures corresponding to each of the engagement score metric parameters using the assigned individual weights.

In an embodiment, the brand monitoring platform configures one or more weighted audience score metric parameters and one or more engagement score metric parameters for determination of the audience score and the engagement score respectively, based on predetermined criteria. Furthermore, in an embodiment, the determination of the audience score and the engagement score for the brand and each of the competing brands by the brand monitoring platform comprises normalizing measures corresponding to one or more of the audience score metric parameters and one or more of the engagement score metric parameters respectively, based on a location of each of the identified industries related to the brand and each of the competing brands, for reducing statistical differences in the measures triggered by a difference of the location of each of the identified industries related to the brand and each of the competing brands. Furthermore, in an embodiment, the brand monitoring platform normalizes measures corresponding to each of the weighted engagement score metric parameters for reducing statistical differences between extreme measures corresponding to each of the weighted engagement score parameters, and for reducing outlier data.

The brand monitoring platform generates an aggregate score for the brand and each of the competing brands using the determined audience score and the determined engagement score. In an embodiment, the brand monitoring platform generates the aggregate score for the brand and each of the competing brands by determining a weighted average of the determined audience score and the determined engagement score. The brand monitoring platform assigns a rank to the brand and each of the competing brands based on the aggregate score for benchmarking the brand based on the social media strength of the brand in comparison with the competing brands in the virtual social media environment. The generated aggregate score of the brand and each of the competing brands benchmarks the brand based on the social media strength of the brand in comparison with the competing brands in the virtual social media environment.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 10A exemplarily illustrates a table displaying results of a computation of an audience score for each of multiple brands in an industry using social media information acquired from a particular social media source.

FIG. 10B exemplarily illustrates a table displaying results of a computation of an engagement score for each of multiple brands in an industry using social media information acquired from a particular social media source.

FIG. 10C exemplarily illustrates a table displaying results of a computation of an aggregate score for each of multiple brands in an industry.

FIGS. 11A-11B exemplarily illustrate screenshots of a graphical user interface provided by the brand monitoring platform, displaying aggregate scores generated for multiple brands in particular industries.

DETAILED DESCRIPTION OF THE INVENTION

Figure 1A:
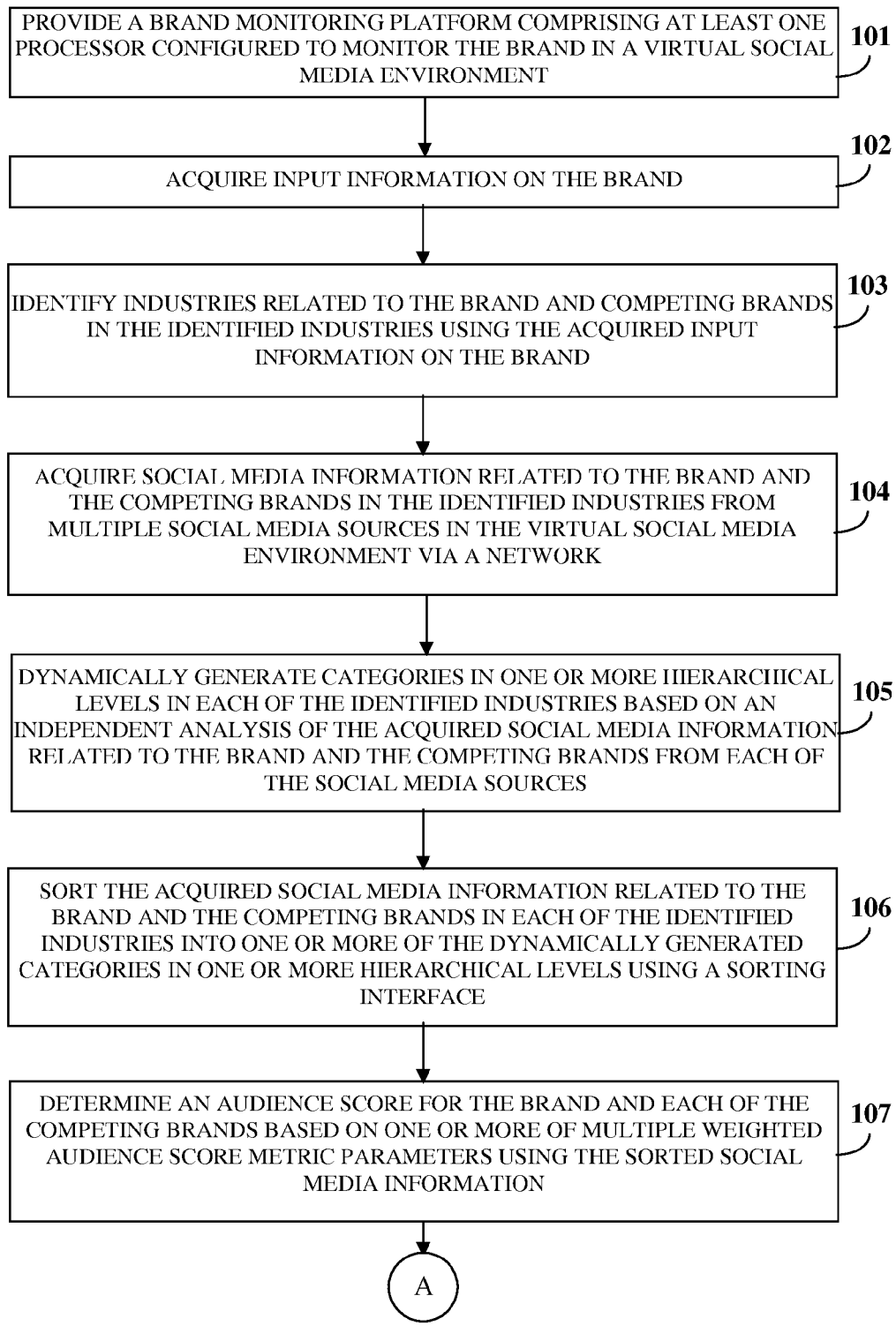
FIGS. 1A-1B illustrate a computer implemented method for benchmarking a brand based on social media strength of the brand.
Figure 1B:
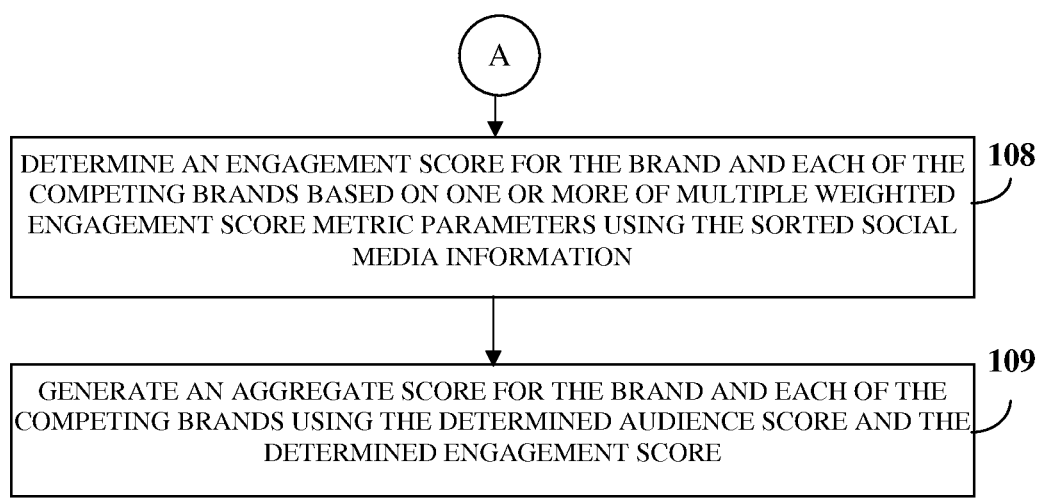

FIGS. 1A-1B illustrate a computer implemented method for benchmarking a brand based on social media strength of the brand. As used herein, the term "social media strength" refers to a measure of strength of consumer reach and consumer interaction supported by a brand in a virtual social media environment. Also, as used herein, the term "virtual social media environment" refers to an environment comprising social media networks and forums that enable interaction between brand owners and/or marketers and brand followers, consumers, etc. The computer implemented method disclosed herein provides 101 a brand monitoring platform comprising at least one processor configured to monitor the brand in a virtual social media environment. The brand monitoring platform is, for example, hosted on an online server. In an embodiment, the brand monitoring platform provides a web application accessible over a network such as the internet or an intranet that performs scoring for benchmarking a brand based on the social media strength of the brand and transmits the results to a database of an online server via the network. The database stores records of scores computed for each of the brands, thereby enabling tracking of growth in market strength of a brand over a predetermined duration of time. The brand monitoring platform monitors visibility of the brand via social media sources and performs an analysis of each response received from online users, brand followers, etc., to events related to the brand, information released on products and/or services offered by the brand, etc., for generating scores that enable comparison between different brands in an industry, thereby providing a benchmarking system for brands. The brand monitoring platform provides a scoring system for brands that reflects their social media strength relative to other brands in the same social media space.

The brand monitoring platform acquires 102 input information on the brand. The input information on the brand comprises, for example, name of the brand, information on products and/or services associated with the brand, demographics of consumers targeted by the brand, geographical marketing data of the brand, market share of the brand, etc. In an embodiment, the brand monitoring platform crawls the web to extract information on the brand based on a preliminary set of inputs received from a brand marketing entity associated with the brand. The brand monitoring platform extracts the input information, for example, from online advertisements, images, videos, consumer forums, press releases, news, events, white papers, etc., of the brand. The brand monitoring platform creates a brand profile based on the acquired input information for each of the brands and tracks and updates changes to the brand profile periodically. In an example, the brand monitoring platform configures application programming interfaces (APIs) for each of multiple online resources comprising, for example, social media sources for automatically retrieving information on a particular brand.

The brand monitoring platform identifies 103 industries related to the brand and competing brands in the identified industries using the acquired input information on the brand. For example, the brand monitoring platform establishes communication with online retail systems via a network, for example, the internet and extracts information on products and/or services with characteristics similar to the products and/or services associated with the brand. The brand monitoring platform identifies brands associated with the products and/or the services having similar characteristics as those of the input brand as "competing brands".

In another example, the brand monitoring platform accesses online public databases via the network to obtain industry specific information for a brand and competing brands in an industry. The brand monitoring platform establishes a connection with databases of multiple social media sources over the network. For example, the brand monitoring platform accesses a web page of a brand hosted on Facebook® of Facebook, Inc. The web page of the brand on Facebook® may list the industries to which the brand belongs. Furthermore, brand information related to the brand is retrieved through an application programming interface (API) customized for accessing brand information from Facebook®. Furthermore, in order to obtain brand information on the competing brands for an industry, the brand monitoring platform establishes a connection to public databases via the network to query and obtain the information related to each of the competing brands. For example, the brand monitoring platform connects to Yahoo!® Finance of Yahoo, Inc., and retrieves brand information, finance information of the competing brands within an industry via an API access. Furthermore, the brand monitoring platform uses, for example, the Facebook® API to obtain brand information of the competing brands in the industry from a Facebook® web page.

In an embodiment, the brand monitoring platform identifies industries using the brand and the competing brands. The brand monitoring platform identifies multiple industries that are associated with a particular brand. A company associated with a brand, for example, provides products and/or services across multiple industries. Consider an example where a particular brand is associated with industries such as healthcare, aviation, fuel and energy management, capital management, etc. The brand monitoring platform identifies competing brands for that particular brand in each of the identified industries and determines from the brand information that the market for the brand extends to multiple industries. The brand monitoring platform benchmarks the brand separately in each of the different identified industries.

The brand monitoring platform acquires 104 social media information related to the brand and the competing brands in the identified industries from multiple social media sources in the virtual social media environment via a network, for example, the internet, an intranet, a local area network, a wide area network, a communication network implementing Wi-Fi® of the Wireless Ethernet Compatibility Alliance, Inc., a cellular network, a mobile communication network such as a global system for mobile communications (GSM) network, a general packet radio service (GPRS) network, etc. As used herein, the term "social media source" refers to an online social platform, for example, an internet forum, a blog, a social network, etc., that enables consumers, brand followers, etc., to network and access information on a brand, discuss brands, establish a brand community, communicate with brand owners and/or marketers, post responses to events or information on products and/or services related to the brands, etc. A brand community is, for example, a group of followers or consumers interested in the products and/or services associated with a brand. A social media source is, for example, Facebook® of Facebook, Inc., Twitter® of Twitter, Inc., Google+™ of Google, Inc., YouTube® of Google, Inc., LinkedIn® of LinkedIn Corporation, etc. The social media information comprises, for example, statistical information on number of followers of a brand at a particular social media source, number of posts posted by brand administrators, brand followers, brand marketers, etc., for example, a number of tweets received for a brand on Twitter®, or a number of shares on Facebook®, the content of the posts, etc. A post is an electronic entry, for example, in the form of a text message input by a fan, a follower, a brand administrator, etc., at a social media source using a computing device. A "tweet" refers to a post made on a micro-blogging website of Twitter®.

The brand monitoring platform dynamically generates 105 categories in one or more hierarchical levels in each of the identified industries based on an independent analysis of the acquired social media information related to the brand and the competing brands from each of the social media sources. The hierarchical levels comprise, for example, a set of sub-categories for each of the dynamically generated categories in each of the identified industries. The dynamically generated categories comprise, for example, a location of each of the identified industries related to the brand and each of the competing brands, a location of each of multiple authors of the social media information, types of social media sources utilized by the brand and each of the competing brands, marketing elements, etc. The categorization of the social media information based on the location of each of the identified industries enables a relative analysis of the social media strength of the brands in line with the preferences of consumers in a particular geographical location. The location of each of the authors of the social media information, for example, followers who regularly post messages, their reviews of products and/or services associated with the brand, etc., determine a scale of interest in the brand and products and/or services associated with the brand for consumers located in the particular location. The types of social media sources utilized by the brand and each of the competing brands comprise, for example, different social networking applications such as Facebook® of Facebook, Inc., Twitter® of Twitter, Inc., Google+™ of Google, Inc., YouTube® of Google, Inc., LinkedIn® of LinkedIn Corporation, etc., utilized by the brand and each of the competing brands. The marketing elements comprise, for example, special discount offers, incentives, etc., redeemable for purchasing the products and/or services associated with the brand. The brand monitoring platform classifies information on the brands and the competing brands for analysis and generation of an aggregate score. The aggregate score represents a relative position of the brand, among its peers and competing brands, in its use of social media.

Consider an example where a brand owner registers a brand in an airlines industry with the brand monitoring platform. The brand monitoring platform analyzes the acquired social media information and determines a first hierarchical level of categories for categorizing the social media information related to brands in the airlines industry, for example, as "brand related", "current events", "industry related", and "miscellaneous". The brand monitoring platform further divides each of the categories into a second hierarchical level of categories. The second hierarchical level of categories is, for example, based on a particular type of industry. For example, the brand monitoring platform divides the "brand related" category of the first hierarchical level into a second hierarchical level of sub-categories, for example, airfare deals, announcements and updates, brand news, corporate social responsibility, marketing elements such as contests or sweepstakes, events, festive offers, frequent flyer programs, frequently asked questions pertaining to the brand, travel destination information, etc. The brand monitoring platform divides the "current events" category of the first hierarchical level into a second hierarchical level of sub-categories, for example, festival and/or greetings posted by followers or the brand marketers, entertainment, events on social media, sports events such as cricket tournaments sponsored by the airlines industry, questions, miscellaneous, etc. The brand monitoring platform divides the "industry related" category of the first hierarchical level into a second hierarchical level of sub-categories, for example, events in the airline industry, facts about the airline industry, questions to followers, news on sectors such as fluctuations recorded in the share market, travel advice, travel destination information, etc. The "miscellaneous" category of the first hierarchical level comprises, for example, information about the airlines industry that is not related to a specific brand.

In an embodiment, the brand monitoring platform performs an independent analysis of the acquired social media information related to the brand and the competing brands from each of the social media sources for dynamically generating categories by determining clusters of similar content portions from the acquired social media information and identifying one or more common categories applicable to the brand and each of the competing brands in each of the identified industries from the determined clusters of similar content portions. The brand monitoring platform analyzes a large number of posts retrieved from multiple social media sources. In an embodiment, the brand monitoring platform performs a keyword analysis and a clustering of the posts to extract common patterns, keywords, etc. For example, the brand monitoring platform applies a clustering computer program for comparing content portions extracted from the social media information acquired from each of the social media sources and generates a similarity score based on a keyword comparison between the content portions. The brand monitoring platform identifies common keywords from the clustered content portions for generating categories. In an example, the brand monitoring platform performs a natural language processing analysis of textual content in the acquired social media information to extract patterns of linguistic similarity between the content portions.

Furthermore, in another example, the brand monitoring platform acquires a set of categories from an authorized user via a graphical user interface (GUI) provided by the brand monitoring platform, sorts the acquired social media information into the acquired categories, and then performs further analysis of the sorted social media information to identify one or more common sub-categories from the acquired social media information applicable to the brand and each of the competing brands in the identified industries. The brand monitoring platform provides a sorting interface on the GUI that enables users to manually tag the keywords and/or the clusters of keywords as separate categories for categorizing the acquired social media information and for generating aggregate scores for each of the brands. The brand monitoring platform supports and maintains the dynamically generated categories along with categories acquired from one or more users. The brand monitoring platform provides an integrated set of categories that are available to users for sorting social media information, for example, posts recorded at a particular social media source.

Consider an example where the brand monitoring platform acquires social media information, for example, posts posted by users at a social media source, for example, Facebook® on a product and/or a service released by a new brand in the market. The brand monitoring platform extracts keywords from each of the posts and compares these keywords with the keywords extracted from each of the other posts to obtain clusters of similar content portions. For example, consider a brand that releases a new soft drink and employs a tagline comprising keywords such as "game changer". The brand monitoring platform excludes all qualifier keywords such as "excellent", "awesome", etc., from the posts during an independent analysis of each of the posts. Furthermore, the posts and messages may recite and reference the tagline of the brand. The brand monitoring platform collects all the posts that have used the keyword "game". In this example, most of the posts may also have the keywords "drink", "beverage", "thirst", "bottle", etc. The brand monitoring platform clusters all the posts with similar content portions, for example, the posts that reference the keywords "drink", "beverage", "bottle", etc., together. The brand monitoring platform determines a higher similarity between the keywords "drink" and "beverage" than the keywords "beverage" and "game". The brand monitoring platform assigns a similarity score based on the amount of similarity between the keywords extracted from the posts. Therefore, the brand monitoring platform assigns a higher similarity score for associated keywords such as "drink" and "beverage" and clusters these keywords together. Therefore, even though there is a high incidence of the keyword "game" through the posts, the brand monitoring platform does not categorize the brand as one related to sports since the similarity between the keywords "game" and "drink" is minimal. Based on the similarity score, the brand monitoring platform identifies a common category, "Food and beverage" for the brand.

The brand monitoring platform sorts 106 the acquired social media information related to the brand and the competing brands in each of the identified industries into one or more of the dynamically generated categories in one or more of the hierarchical levels using the sorting interface provided by the brand monitoring platform. The sorting interface is, for example, hosted on the graphical user interface (GUI) provided by the brand monitoring platform. The brand monitoring platform acquires inputs, for example, as tags, for sorting the acquired social media information related to the brand and the competing brands in each of the identified industries into one or more of the dynamically generated categories in the hierarchical levels from a user via the sorting interface. The sorting interface displays the complete set of categories and sub-categories for each of the identified industries and provides interface options for manually tagging the social media information, for example, posts from a social media source to a particular category or a sub-category. The brand monitoring platform therefore allows a user to manually tag posts into the categories generated by the brand monitoring platform or the categories acquired from one or more users and maintained by the brand monitoring platform, for example, based on the industry related to the brand. The provision for manual tagging allows sorting of the social media information based on user preferences. The steps for sorting the acquired social media information are disclosed in the detailed description of FIGS. 9A-9D.

The brand monitoring platform determines 107 an audience score for the brand and each of the competing brands by measuring an aggregate reach of the brand and each of the competing brands in the virtual social media environment based on one or more of multiple weighted audience score metric parameters using the sorted social media information. The term "aggregate reach" refers to an extent of visibility that a brand has garnered at a particular social media source. The weighted audience score metric parameters comprise, for example, a number of followers of the brand and each of the competing brands at each of the social media sources, a rate of growth of the number of followers of the brand and each of the competing brands, a number of recommendations for the brand and each of the competing brands at each of the social media sources from each of the followers, a number of references made to the brand and each of the competing brands at each of the social media sources by the followers, aggregate responses to products, services, and/or events associated with the brand and each of the competing brands, etc. For example, the brand monitoring platform defines audience score metric parameters as a number of fans or followers for the brand at social media sources such as Facebook®, Twitter®, Google+™, etc., the rate of growth of the fans, that is, how quickly the number of fans are growing in a brand community at each of the social media sources, recommendations from the followers, number of online consumers who mention the brand, aggregate responses such as "retweets", "shares", "likes", etc., from the fans or followers, the commercial or market size of the brand, etc. A "share" refers to a sharing action performed by a user at a social media source using a share option provided by the social media source for sharing content between users. A "like" refers to a positive input provided by a user at a social media source using a like option provided by the social media source for expressing that he/she likes, enjoys, or supports particular content.

In an embodiment, the brand monitoring platform normalizes measures corresponding to each of the audience score metric parameters. Normalization is a technique that allows data on different scales to be compared by bringing them to a common scale. As used herein, the term "measures" refers to values of the metric parameters. The brand monitoring platform assigns individual weights to the audience score metric parameters as disclosed in the detailed description of FIG. 6. The brand monitoring platform determines a weighted average of the normalized measures corresponding to each of the audience score metric parameters using the assigned individual weights to determine the audience score.

The brand monitoring platform determines 108 an engagement score for the brand and each of the competing brands by measuring interaction between the brand and each of the competing brands and their corresponding followers based on one or more of multiple weighted engagement score metric parameters using the sorted social media information. The weighted engagement score metric parameters comprise, for example, nature of responses to one or more brand actions of the brand and each of the competing brands from each of the followers of the brand and each of the competing brands, a number of brand notification messages, sentiments of the followers towards the brand and each of the competing brands, a number of fan posts extracted from the acquired social media information, relevance of the fan posts to the brand and each of the competing brands. As used herein, the term "brand action" refers to an event or an action carried out by a particular brand that affects consumers of the brand. A brand action is, for example, a release of a new product associated with the brand, announcement of discount offers, incentives, etc. The brand monitoring platform sets engagement score metric parameters, for example, how fans respond to the brand actions, for example, through likes, comments, shares, +1s, retweets, replies, up votes, down votes, etc., how much effort the brand puts into a web page at a social media source using number of posts, tweets, videos, photos, links, polls, brand messages, advertisements, etc., posted by brand marketers, an extent of involvement of the fans in the brand community based on the number of fan posts, relevance of the fan posts to the brand, how the fans identify with the brand, the sentiment of the fans towards the brand, that is, whether the fans post messages reflecting a positive sentiment, a negative sentiment, or a neutral sentiment, etc. The brand monitoring platform performs sentiment analysis of, for example, the fan responses, comments, replies, video responses, mentions, etc., to determine the engagement score.

In an embodiment, the brand monitoring platform determines an engagement score for the brand and each of the competing brands by normalizing measures corresponding to each of the engagement score metric parameters, assigning individual weights to the engagement score metric parameters, and determining a weighted average of the normalized measures corresponding to each of the engagement score metric parameters using the assigned individual weights.

In an embodiment, the brand monitoring platform configures one or more weighted audience score metric parameters and one or more weighted engagement score metric parameters for determination of the audience score and the engagement score respectively, based on predetermined criteria. For example, on completing sorting and categorization of the acquired social media information, the brand monitoring platform has access to information on the type of content posted by the brands. The brand monitoring platform uses a percentage of posts related to the brand, or a percentage of posts related to the industry as metric parameters to be used for computing an aggregate score. The predetermined criteria for configuring the metric parameters are set differently for different social media sources. For example, for a particular social media source such as Facebook®, the brand monitoring platform assigns a higher weight for a percentage of posts related to a brand than to a percentage of posts related to an industry where the brands are operative.

In an embodiment, the brand monitoring platform retrieves the social media information comprising measures for each of the audience score metric parameters and the engagement score metric parameters via application programming interfaces (APIs) generated for each of the social media sources. For example, the brand monitoring platform, in collaboration with each of the social media sources, generates separate application programming interfaces for Facebook®, Twitter®, LinkedIn®, etc. The brand monitoring platform configures the APIs for each of the social media sources to automatically retrieve the social media information related to the brand and the competing brands in the identified industries from each of the social media sources in the virtual social media environment.

Furthermore, in an embodiment, the determination of the audience score and the engagement score for the brand and each of the competing brands by the brand monitoring platform comprises normalizing measures corresponding to the audience score metric parameters and the engagement score metric parameters respectively, based on a location of each of the identified industries related to the brand and each of the competing brands, for reducing statistical differences in the measures triggered by a difference of the location of each of the identified industries related to the brand and each of the competing brands. Consider an example where a particular brand has established a relatively larger market in a particular geographical location when compared to another geographical location where the brand is yet to establish a sizeable market. Furthermore, the nature of a product associated with the brand may affect the suitability of the product to a particular geographical location. For example, a skin tanning cream may have a greater market in a cold country than in a country located in an equatorial region. Therefore, the number of posts related to the skin tanning cream retrieved from a particular social media source, from consumers in the cold country is statistically higher than the number of posts from consumers in the country located in the equatorial region. However, a sun protection cream offered by the same brand may trigger a greater response to the product on that particular social media source from consumers in the equatorial region. Therefore, this may result in a skewed analysis of a particular brand and all the competing brands. In order to balance the statistical differences induced by changes in geography, demographics, etc., the brand monitoring platform normalizes the measures corresponding to one or more of the audience score metric parameters or the engagement score metric parameters that are affected by changes in the geography. This ensures that when an aggregate score is computed for all the brands in an industry, systemic high aggregate scores for brands in a particular geographical location do not overpower systemic low scores of the brands in a different geographical location. In an example, the normalization of the measures corresponding to the audience score metric parameters and the engagement score metric parameters comprises statistically processing their respective measures to ensure a match between a median value and a variance value for each of the locations of the identified industries related to the brand and the competing brands.

In an embodiment, the brand monitoring platform normalizes measures corresponding to each of the weighted audience score metric parameters for reducing statistical differences between extreme measures corresponding to each of the weighted audience score parameters, and for reducing outlier data. Furthermore, in an embodiment, the brand monitoring platform normalizes measures corresponding to each of the weighted engagement score metric parameters for reducing statistical differences between extreme measures corresponding to each of the weighted engagement score parameters, and for reducing outlier data. The outlier data comprise one or more values of the measures corresponding to the audience score metric parameters or the engagement score metric parameters that deviate markedly from the other values of the measures.

The statistical differences between the measures corresponding to each of the metric parameters affect a variance and consequently a standard deviation of a statistical distribution of the measures corresponding to each of the metric parameters. For example, a comparative analysis between a brand and a competing brand with respect to an audience score metric parameter "growth of a number of fans" may be inaccurate due to a large variance between extreme measures in the statistical distribution triggered by outlier data in the statistical distribution of one of the brands. The outlier data may be recorded as a result of an abrupt increase in the number of fans for a brand for a short period of time. Furthermore, larger statistical differences between the measures of a metric parameter affect a mean value of the statistical distribution for that metric parameter. Therefore, a comparative analysis between a brand and a competing brand based on an average number of fans for each of the brands is likely to be inaccurate since the mean value is affected by the extreme measures of the statistical distribution. The brand monitoring platform therefore normalizes the audience score and the engagement score by statistically processing the audience score and the engagement score respectively to have an identical mean value and variance value.

The brand monitoring platform generates 109 an aggregate score for the brand and each of the competing brands using the determined audience score and the determined engagement score. The brand monitoring platform generates a separate aggregate score for each brand for each social media source used by the brand. In an embodiment, the brand monitoring platform generates the aggregate score for the brand and each of the competing brands by determining a weighted average of the determined audience score and the determined engagement score. In an embodiment, the brand monitoring platform performs normalization, for example, by converting the audience scores and the engagement scores to a common median and a common standard deviation to allow the audience scores and the engagement scores to be combined to generate the aggregate scores. The aggregate score is specific to the industry and/or geography in which the brand operates. In an example, the brand monitoring platform generates an aggregate score exclusively, that is, an aggregate score that is only valid in a category for which the aggregate score is developed, and excludes comparison of aggregate scores between two industries. This enables benchmarking for brands against their competitors or peers in a similar industry. Therefore, considering the wide variation among brands in a targeted market, demographics, brand messages, actual products and/or services, marketing strategies etc., a narrowly focused aggregate score reflects a more balanced analysis of brands in a particular industry.

The aggregate score is an independent score that can be used by brand owners to track the pulse of enterprise social activity within industries. The aggregate score can be used by brand owners of, for example, new brands to ascertain their position among peers and competing brands in their use of social media. The aggregate score can be used by brand owners of, for example, lagging brands to dissect and understand strategies used by top ranking brands to achieve their top scores. The aggregate score can be used by brand owners to validate that their social media strategy is working as intended by monitoring the changes in their aggregate score relative to all socially active brands.

The brand monitoring platform assigns a rank to the brand and each of the competing brands based on the aggregate score for benchmarking the brand based on the social media strength of the brand in comparison with the competing brands in the virtual social media environment. For example, a brand assigned with a rank of one may be considered as a leading brand for a particular industry in a particular geographical location. The aggregate score and the brand rank of a brand and each of the competing brands benchmarks the brand based on the social media strength of the brand in comparison with the competing brands in the virtual social media environment.

In an embodiment, the brand monitoring platform tracks changes to the acquired social media information, input information acquired on the brands, etc., and automatically updates the audience score, the engagement score, the aggregate score, and the brand rank of each of the brands in the industry. The brand monitoring platform transmits a notification to each of the brand communities, brand marketers, etc., who have registered with the brand monitoring platform, for example, via an electronic mail (email) notification, a pop-up message on a display window, etc., on the updated changes to the aggregate score and the brand rank.

Figure 2:
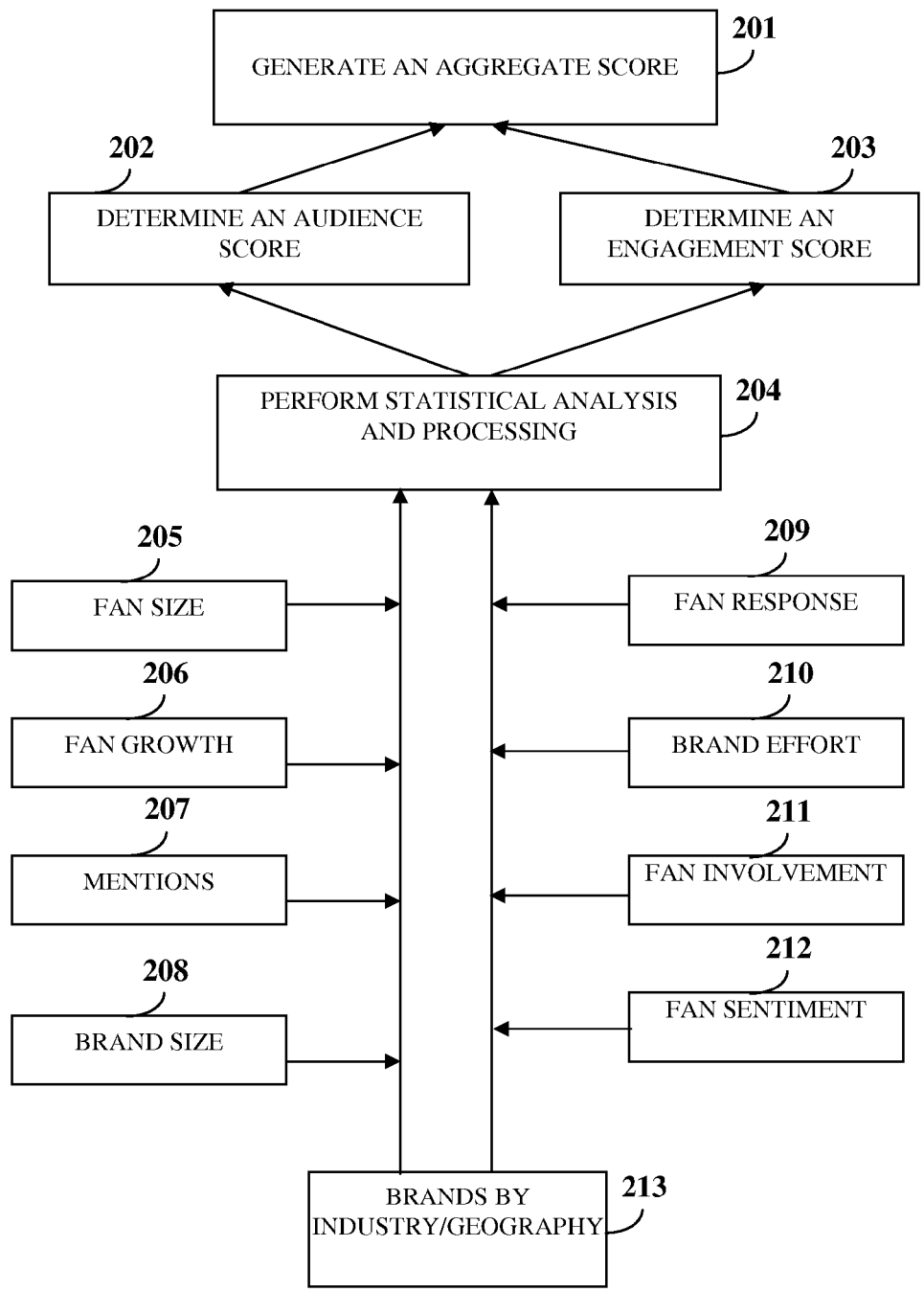
FIG. 2 exemplarily illustrates a flowchart comprising the steps performed by a brand monitoring platform for generating an aggregate score for benchmarking a brand based on the social media strength of the brand.

FIG. 2 exemplarily illustrates a flowchart comprising the steps performed by the brand monitoring platform for generating an aggregate score for benchmarking a brand based on the social media strength of the brand. In order to generate 201 an aggregate score, the brand monitoring platform acquires inputs, for example, whether the brand needs to be benchmarked by the industry or the geographical location 213 of the brand, the measures corresponding to the audience score metric parameters, for example, fan size 205, fan growth 206, number of "mentions" 207 of a product and/or services offered by the brand, and a brand size 208, and the measures corresponding to the engagement score metric parameters, for example, fan response 209 of each of the followers of the brand, brand effort 210 quantified by a number of updates to the brand information, incentives, notifications, etc., posted by the brand marketers, an extent of fan involvement 211, fan sentiment 212, that is whether the brand has received posts reflecting a positive sentiment, a negative sentiment, or a neutral sentiment, from the fans, etc. The brand monitoring platform performs statistical analysis and processing 204 to normalize the different measures corresponding to each of the audience score metric parameters and the engagement score metric parameters such that statistical differences triggered by changes in industry and/or geography are reduced. The brand monitoring platform determines 202 the audience score based on the audience score metric parameters and determines 203 the engagement score based on the engagement score metric parameters. The brand monitoring platform generates 201 an aggregate score using the audience score and the engagement score. For example, the brand monitoring platform computes a weighted average of the audience score and the engagement score to generate the aggregate score.

Figure 3:
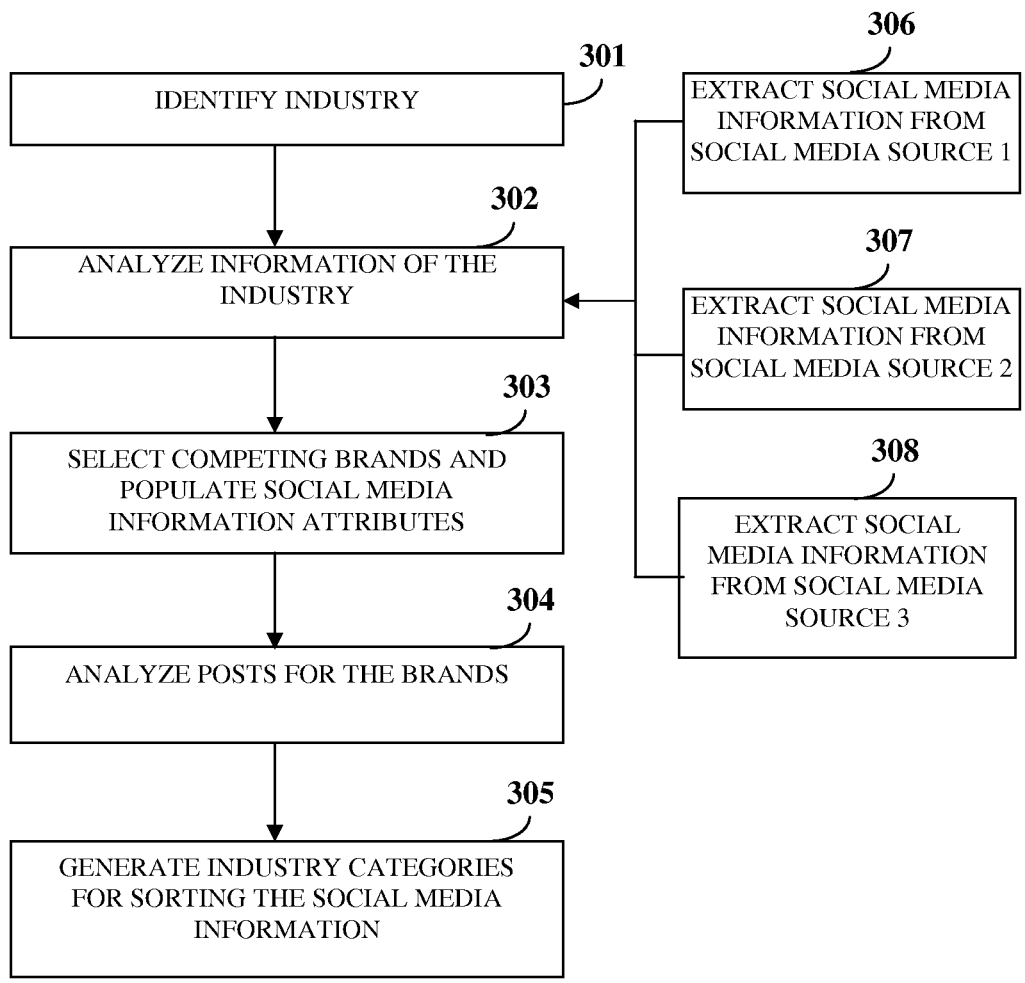
FIG. 3 exemplarily illustrates a flowchart comprising the steps performed by the brand monitoring platform for dynamically generating categories in each of multiple industries related to a brand and competing brands.

FIG. 3 exemplarily illustrates a flowchart comprising the steps performed by the brand monitoring platform for dynamically generating categories in each of multiple industries related to a brand and competing brands. Consider an example where a brand, for example, a cosmetic brand needs to be benchmarked based on its social media strength. The brand may be a part of multiple industries, for example, a chemical industry, a cosmetics industry, etc. The brand monitoring platform identifies 301 a particular industry for the brand. The brand monitoring platform extracts 306, 307, and 308 social media information from each of multiple social media sources, for example, a social media source 1 such as Facebook®, a social media source 2 such as Twitter®, and a social media source 3 such as YouTube® respectively. The brand monitoring platform analyzes 302 general information on the particular industry, including brand information and other social media information related to the brand and the competing brands, extracted via application programming interfaces (APIs) associated with the social media sources 1, 2, and 3 respectively.

The brand monitoring platform selects 303 important competing brands in the identified industry and populates 303 social media information attributes extracted from the social media information, for example, in a relational database management system. The brand monitoring platform employs a clustering algorithm to collect the social media information relevant to all brands in a particular industry. The brand monitoring platform analyzes 304 the social media information, for example, posts published on a social media source for each of the brands. The brand monitoring platform dynamically generates 305 industry categories for sorting the social media information using keywords extracted from the social media information. The brand monitoring platform provides a sorting interface for manually tagging the social media information into the dynamically generated categories, for example, based on an industry of each brand.

Figure 4:
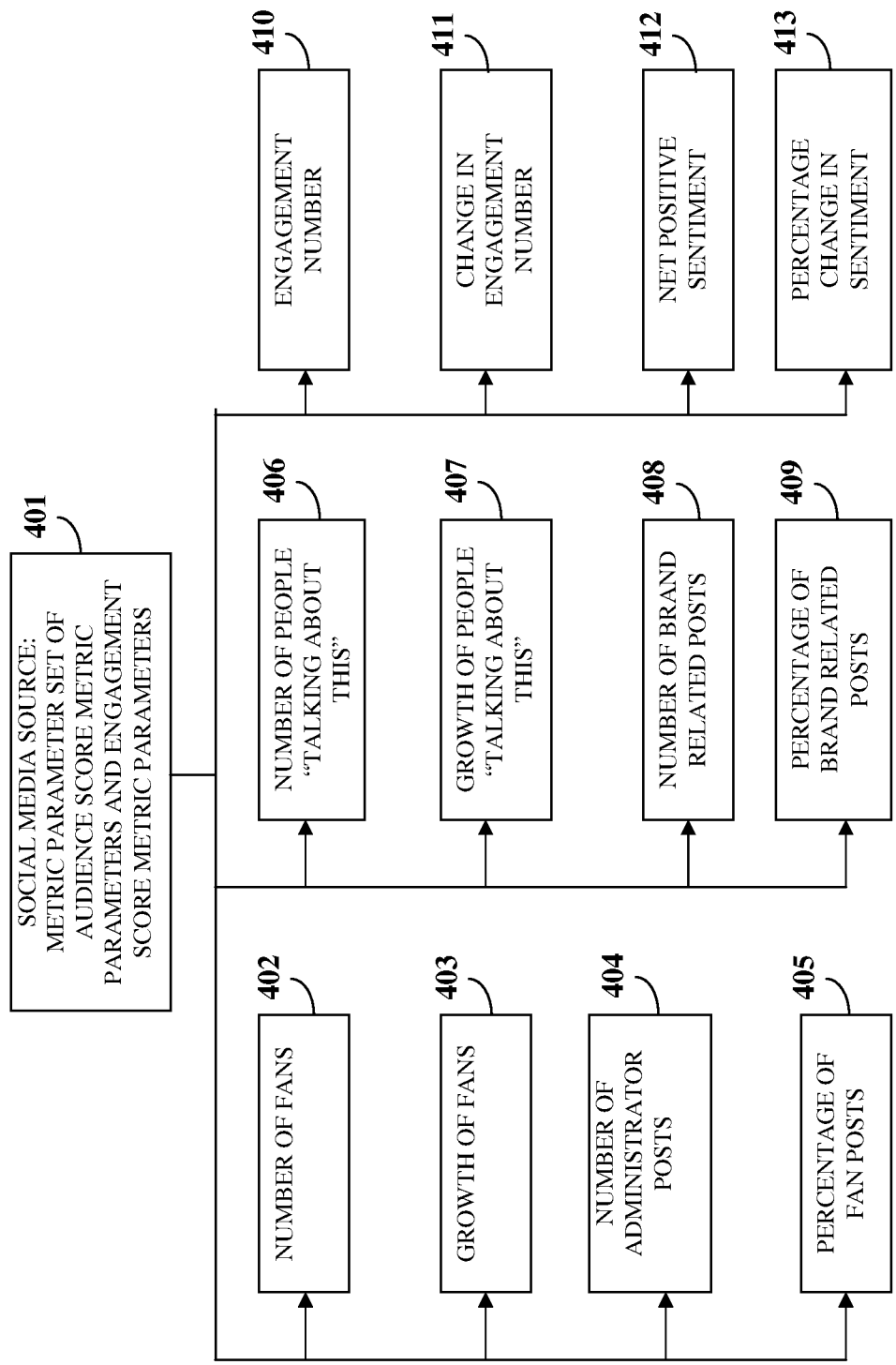
FIG. 4 exemplarily illustrates a schematic diagram indicating metric parameters used for determining an audience score and an engagement score.

FIG. 4 exemplarily illustrates a schematic diagram indicating metric parameters used for determining an audience score and an engagement score. The brand monitoring platform extracts social media information via an application programming interface (API) maintained for a particular social media source. For example, the brand monitoring platform acquires social media information from the Facebook® API for each of the brands and extracts measures corresponding to the audience score metric parameters and the engagement score metric parameters stored in a metric parameter set 401. The measures are broadly classified, for example, into two types of measures. One of the measures is related to quantitative aspects of the brand, that is, the size of the brand and the other measure relates to qualitative aspects of the brand. The quantitative measures comprise, for example, number of fans 402, growth of fans 403, that is, increase or decrease in the number of fans over a period of time, number of administrator posts 404, percentage of fan posts 405, the number of consumers discussing a product or a service associated with the brand, represented by the metric parameter "number of people talking about this" 406, growth of "people talking about this" 407, number of brand related posts 408, the percentage of brand related posts 409, etc. The qualitative measures comprise, for example, an engagement number 410, a change in the engagement number 411, a net positive sentiment 412 of the posts derived from the number and percentage of posts with positive sentiments, the percentage of change in sentiment 413 over a period of time, etc. The brand monitoring platform computes the engagement number of a post based on how the post engages with users using metric parameters, for example, a number of "shares", a number of "comments", a "number of likes", etc. The brand monitoring platform then combines the engagement numbers for all the posts of a brand to obtain the engagement score for a brand. The brand monitoring platform analyzes the data collected over a predetermined duration of time, for example, over a month, for calculating the audience score and the engagement score. The brand monitoring platform computes the engagement score and the growth of the engagement score for a brand, for example, based on the number of likes, comments, shares for posts, the number and percentage of posts authored by a brand or followers of the brand, the number and percentage of posts in each dynamically or manually generated category for a brand for each industry.

Figure 5:
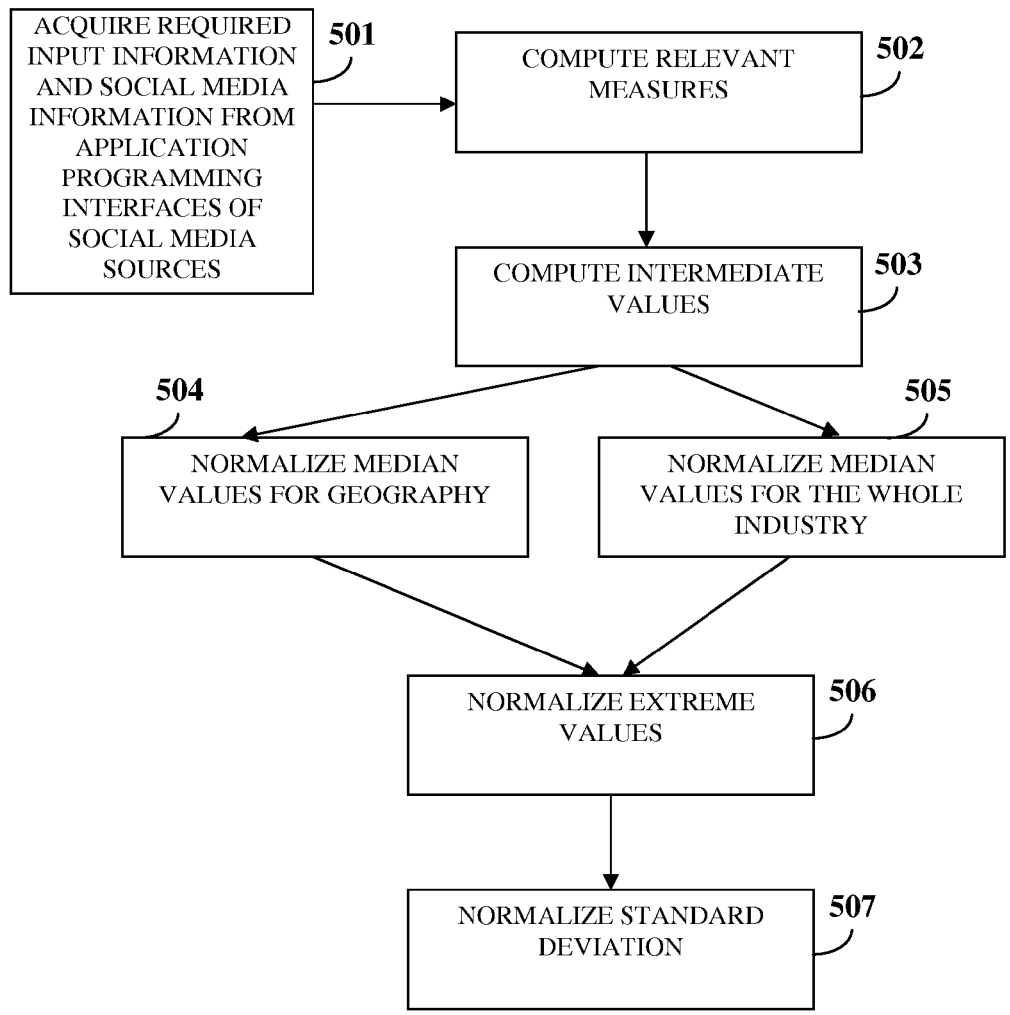
FIG. 5 exemplarily illustrates a flowchart comprising the steps performed by the brand monitoring platform for normalizing measures corresponding to audience score metric parameters or engagement score metric parameters.

FIG. 5 exemplarily illustrates a flowchart comprising the steps performed by the brand monitoring platform for normalizing measures corresponding to audience score metric parameters or engagement score metric parameters. The brand monitoring platform acquires 501 required input information and social media information from each of the application programming interfaces (APIs) associated with each of the social media sources. The brand monitoring platform computes 502 the relevant measures for each of the audience score metric parameters and the engagement score metric parameters, for example, by counting a total number of posts for a particular brand on a particular social media source. The brand monitoring platform normalizes the measures corresponding to each of the metric parameters to remove statistical differences. The brand monitoring platform then processes the normalized measures and computes 503 intermediate values for each of the measures. The intermediate values are values that allow easier mathematical manipulation for computation of the audience score or the engagement score, and are therefore better suited for computation of the audience score or the engagement score. For example, for analyzing a sentiment of each of the posts posted by consumers, followers, etc., on a social media source, the brand monitoring platform computes the intermediate values by first obtaining the net sentiment. The net sentiment is computed as: a positive sentiment percentage minus a negative sentiment percentage. A shift operation is performed on the net sentiment values such that a negative value of the net sentiment is converted to a positive value. For example, consider an audience score metric parameter "number of fans". Since the measures of the audience score metric parameter could be very large or very small, the brand monitoring platform computes an intermediate value equal to a square root of the audience score metric parameter "number of fans".

The brand monitoring platform normalizes the distribution of measures for one or more metric parameters that are affected by changes in the geography by normalizing 504 median values of the measures according to geography. That is, the brand monitoring platform normalizes the measures for each metric parameter by geography, in order to reduce large statistical differences in the measures arising due to differences in geographical locations of the brands. In another example for normalization, the brand monitoring platform normalizes the measures by making a median and a variance similar for each geographical location. The brand monitoring platform also normalizes 505 median values of the other measures that are not geographically normalized, for the whole industry. For example, some quantitative measures may not be affected by geography. Therefore, the brand monitoring platform does not geographically normalize the measures that are not affected by geography and instead normalizes these measures for the whole industry. The brand monitoring platform performs normalization of the other measures by normalizing variances in the measures. Furthermore, the normalization of the measures reduces the effect of outlier data.

Figure 13:
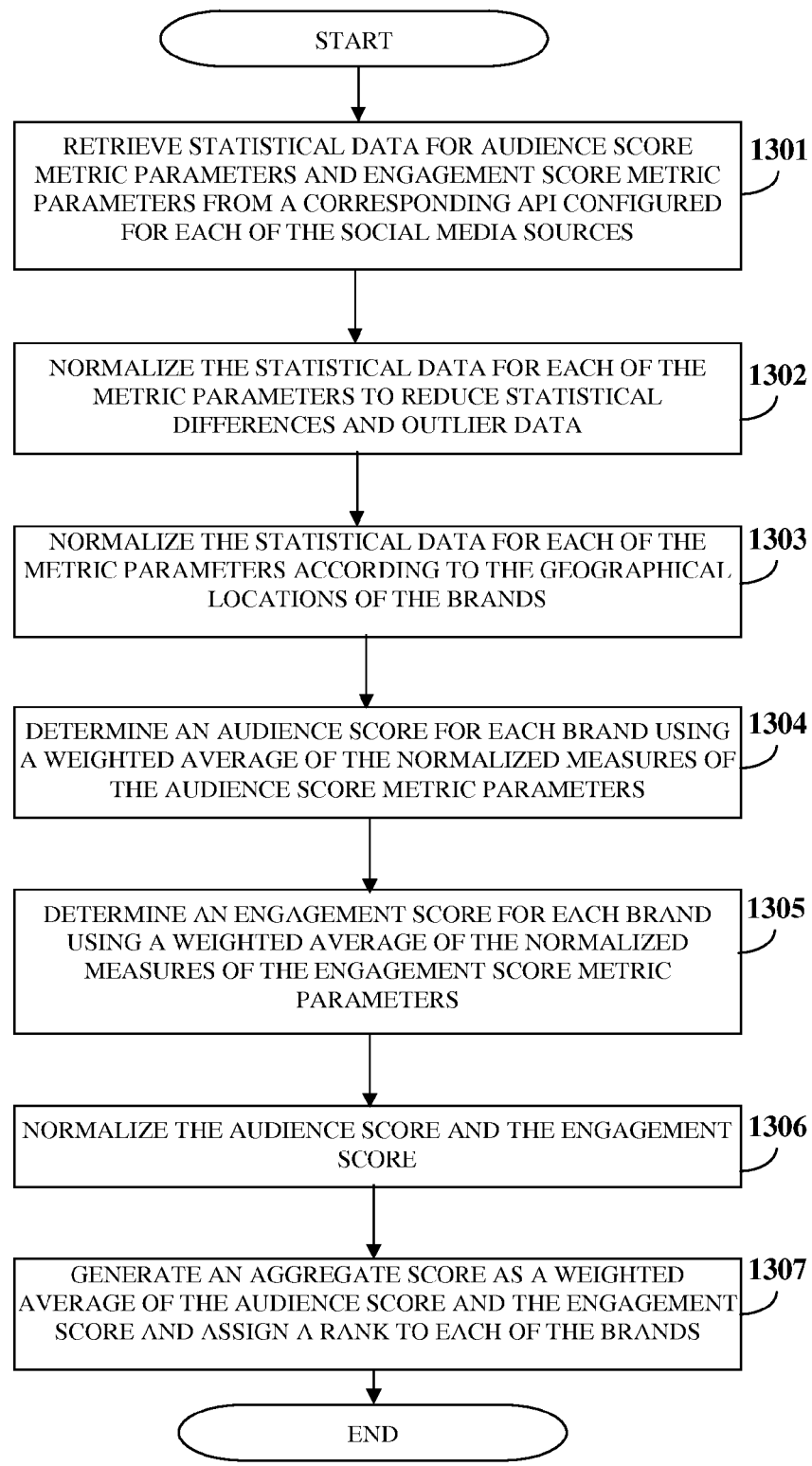
FIG. 13 exemplarily illustrates a flowchart comprising the steps for benchmarking a brand based on the social media strength of the brand in a particular industry.

The brand monitoring platform normalizes 506 extreme values in the distribution of the measures by tapering the extreme values, as disclosed in the detailed description of FIG. 13, to further reduce the effect of outlier data. The brand monitoring platform normalizes extreme values since the extreme values may be representative of outlier data. For example, all data corresponding to the measures of the audience score metric parameters and the engagement score metric parameters contain some outlier data that is not representative of a sample of each of the measures. The brand monitoring platform tamps down the extreme values so that they do not affect the samples of the measures of the respective audience score metric parameters or the respective engagement score metric parameters by a considerable extent. After normalization of the extreme values among the samples, the different measures cannot be compared to each other directly because each of the measures may have different variances. Since comparing such measures directly may lead to errors, the brand monitoring platform normalizes the variances such that all measures have the same median and the same variance in order to ensure that all the measures are comparable with each other. Furthermore, the brand monitoring platform then normalizes 507 a standard deviation of the measures for one or more audience score metric parameters and/or engagement score metric parameters.

Figure 6:
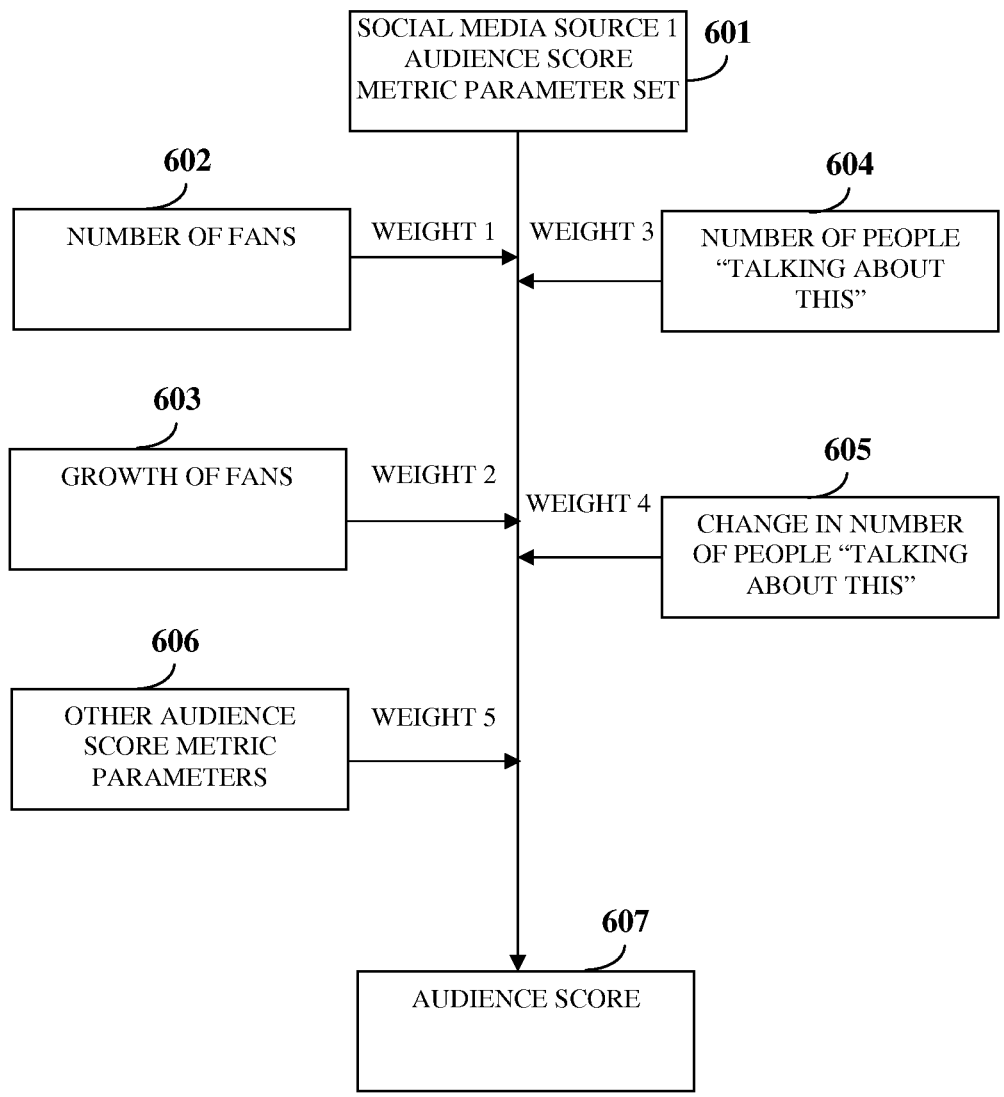
FIG. 6 exemplarily illustrates a schematic diagram for determining an audience score for a brand.

FIG. 6 exemplarily illustrates a schematic diagram for determining an audience score 607 for a brand. Consider a social media source 1, for example, Facebook®. The brand monitoring platform configures an audience score metric parameter set 601 comprising audience score metric parameters associated with the social media source Facebook® for computing the audience score 607 for the brand. The brand monitoring platform assigns different weights, for example, weight 1, weight 2, weight 3, weight 4, and weight 5 to the audience score metric parameters herein referred to as "quantitative metrics". The weights assigned for each of the quantitative metrics, for example, depend on the industry identified for the brand. The quantitative metrics comprise, for example, a number of fans 602, growth of fans 603, a number of people "talking about this" 604, that is, a number of people discussing products and/or services associated with the brand, at the social media source, a change in the number of people "talking about this" 604, and other audience score metric parameters 606.

The brand monitoring platform determines the audience score 607 using a weighted average of the normalized measures of the quantitative metrics. For example, the brand monitoring platform computes a mathematical product of a measure of the quantitative metric "number of fans" 602 with weight 1 and uses the computed mathematical product as one of the inputs for calculating the audience score 607. Similarly, the brand monitoring platform computes a mathematical product of a measure of the quantitative metric "growth of fans" 603 with weight 2, a mathematical product of a measure of the quantitative metric "number of people talking about this" 604 with weight 3, a mathematical product of a measure of the quantitative metric "change in the number of people talking about this" 605 with weight 4, and a mathematical product of a measure of the quantitative metric "other audience score metric parameters" 606 with weight 5. The brand monitoring platform then determines the audience score 607 using the computed mathematical products as inputs. The weights determine the contribution of each of the quantitative metrics to the audience score 607.

Figure 7:
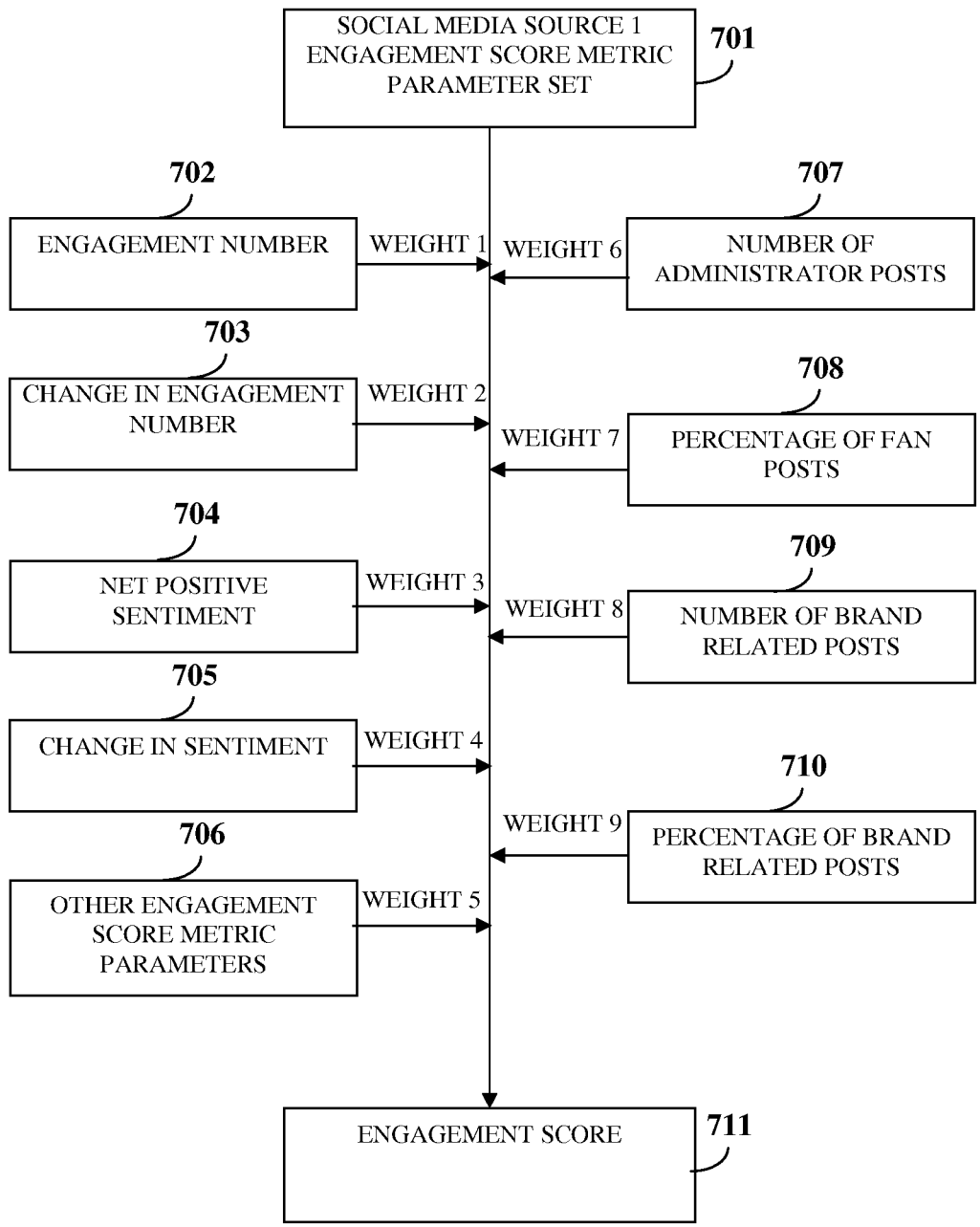
FIG. 7 exemplarily illustrates a schematic diagram for determining an engagement score for a brand.

FIG. 7 exemplarily illustrates a schematic diagram for determining an engagement score 711 for a brand. Consider a social media source 1, for example, Facebook®. The brand monitoring platform configures an engagement score metric parameter set 701 comprising engagement score metric parameters associated with the social media source Facebook® for computing the engagement score 711 for the brand. The brand monitoring platform assigns different weights, for example, weight 1, weight 2, weight 3, weight 4, weight 5, weight 6, weight 7, weight 8, and weight 9 to each of the engagement score metric parameters herein referred to as "qualitative metrics". The qualitative metrics comprise, for example, an engagement number 702, a change in the engagement number 703, a net positive sentiment 704 analyzed from the posts extracted from the acquired social media information, a change in sentiment 705 of the posts, other engagement score metric parameters 706, a number of administrator posts 707, a percentage of fan posts 708, a number of brand related posts 709, and a percentage of brand related posts 710.

The brand monitoring platform determines the engagement score 711 using a weighted average of the normalized measures of the qualitative metrics. For example, the brand monitoring platform computes a mathematical product of a measure of the qualitative metric "engagement number" 702 with weight 1 and uses the computed mathematical product as one of the inputs for calculating the engagement score 711. Similarly, the brand monitoring platform computes a mathematical product of a measure of the qualitative metric "change in the engagement number" 703 with weight 2, a mathematical product of a measure of the qualitative metric "net positive sentiment" 704 with weight 3, a mathematical product of a measure of the qualitative metric "change in sentiment" 705 with weight 4, a mathematical product of a measure of the qualitative metric "number of administrator posts" 707 with weight 6, a mathematical product of a measure of the qualitative metric "percentage of fan posts" 708 with weight 7, a mathematical product of a measure of the qualitative metric "number of brand related posts" 709 with weight 8, a mathematical product of a measure of the qualitative metric "percentage of brand related posts" 710 with weight 9, and a mathematical product of a measure of the qualitative metric "other engagement score metric parameters" 706 with weight 5. The brand monitoring platform then determines the engagement score 711 using the computed mathematical products as inputs. The weights determine the contribution of each of the qualitative metrics to the engagement score 711.

Figure 8:
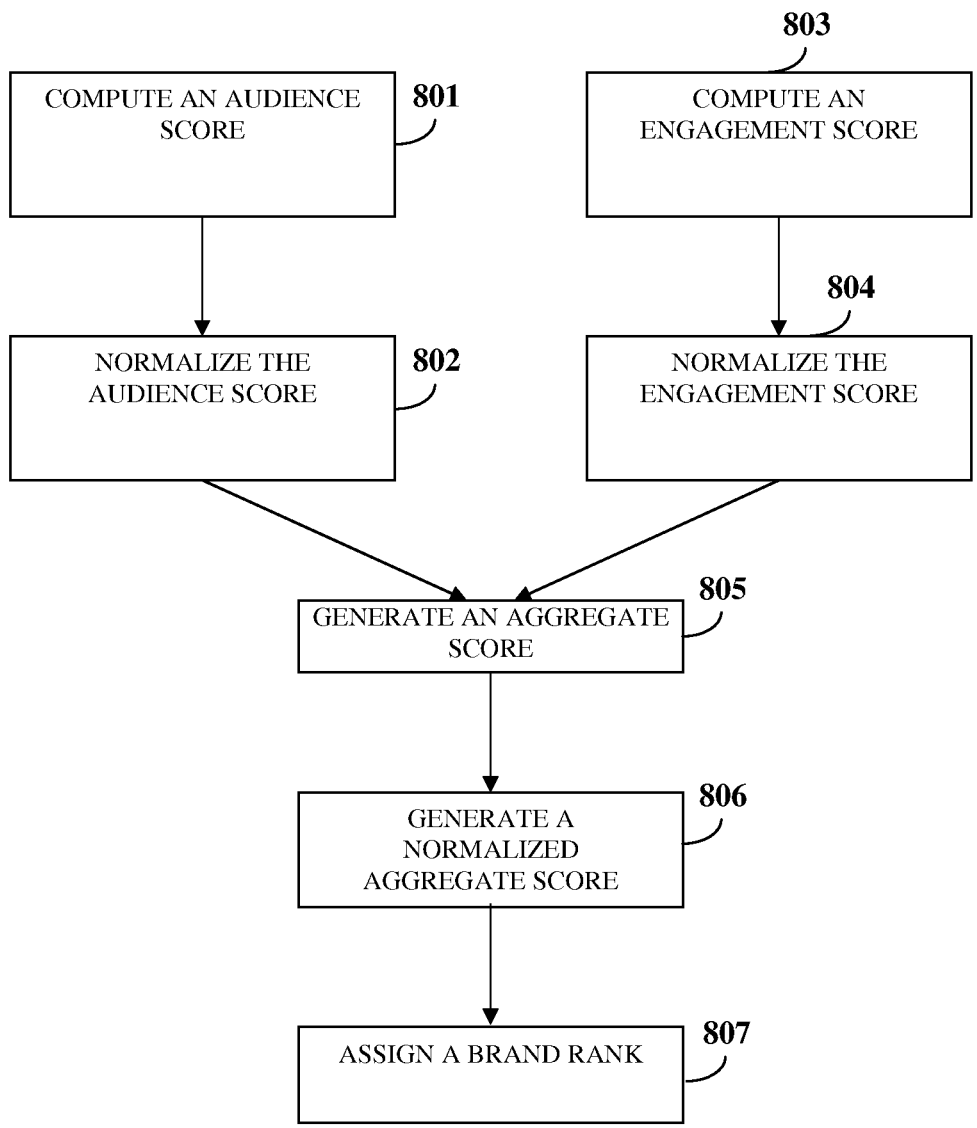
FIG. 8 exemplarily illustrates a flowchart comprising the steps for determining an aggregate score for a brand.

FIG. 8 exemplarily illustrates a flowchart comprising the steps for determining an aggregate score for a brand. The brand monitoring platform computes 801 an audience score as disclosed in the detailed description of FIG. 6, and normalizes 802 the audience score to ensure that the normalized audience score has the same mean and variance. The brand monitoring platform then computes 803 the engagement score as disclosed in the detailed description of FIG. 7, and normalizes 804 the engagement score to ensure that the normalized engagement score has the same mean and variance. The brand monitoring platform computes a weighted average of the normalized audience score and the normalized engagement score to generate 805 an aggregate score. The brand monitoring platform normalizes the generated aggregate score to generate 806 a normalized aggregate score as disclosed in the detailed description of FIG. 13. The brand monitoring platform assigns 807 a brand rank to the brand based on the normalized aggregate score and compares the assigned ranks of the brand and competing brands for benchmarking.

Figure 9A:
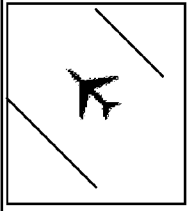
FIGS. 9A-9D exemplarily illustrate screenshots of a sorting interface provided by the brand monitoring platform for sorting social media information into one or more dynamically generated categories.
Figure 9B:
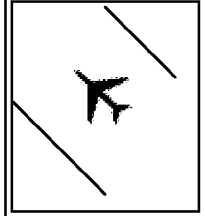

FIGS. 9A-9D exemplarily illustrate screenshots of a sorting interface provided by the brand monitoring platform for sorting social media information into one or more dynamically generated categories. FIG. 9A exemplarily illustrates a screenshot of the sorting interface displaying categories dynamically generated by the brand monitoring platform for sorting social media information related to a brand in an aviation industry. The sorting interface is, for example, hosted on the graphical user interface (GUI) provided by the brand monitoring platform. The sorting interface is configured to display the categories and options for sorting the social media information into the categories. In this example, the dynamically generated categories are "related to ABC Airways", "related to aviation in general", "related to an event, occasion, person, or place", and "not related to anything". The sorting interface provides a tag element, for example, in the form of a command button for each of the dynamically generated categories. An authorized user may click on a command button to tag a post extracted from the social media information to a particular category.

Once the brand monitoring platform has developed the categorization schema for brands in the aviation industry, the brand monitoring platform allows manual categorization of posts extracted from the social media information for each brand in the aviation industry via the sorting interface. The sorting interface allows an authorized user to sort or tag the social media information. In this example, the social media information comprises an administrator post about a government department strike in the public sector that affects all airlines at the Heathrow airport. The authorized user sorts or tags the administrator post into the category "related to aviation in general", for example, by clicking on a command button labeled as "related to aviation in general" on the sorting interface as exemplarily illustrated in FIG. 9B.

Figure 9C:
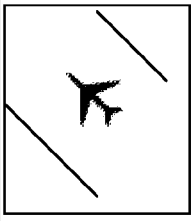
Figure 9D:

FIG. 9C exemplarily illustrates a screenshot of the sorting interface displaying dynamically generated categories in another hierarchical level. These sub-categories allow another hierarchical level of categorization performed by the brand monitoring platform. The sorting interface displays the sub-categories or a second hierarchical level of categories. The sub-categories in the second hierarchical level under the main category "Related to aviation in general" comprise, for example, "news in airlines sector", "travel advice", "events", "fact", "Questions to the fans", "Travel destination information", and "Others". The sorting interface provides a tag element, for example, in the form of a command button for each of the sub-categories. The brand monitoring platform categorizes the social media information into one or more of the sub-categories. Furthermore, the sorting interface provided by the brand monitoring platform enables a user to tag the social media information to one or more of the sub-categories. In this example, the post may be tagged as travel advice and news in the airlines sector. Therefore, the brand monitoring platform, based on the inputs received via the sorting interface, categorizes the post under the "travel advice" sub-category and the "News in airline sector" sub-category by clicking on the corresponding command buttons as exemplarily illustrated in FIG. 9D.

FIG. 10A exemplarily illustrates a table displaying results of a computation of an audience score for each of multiple brands in an industry using social media information acquired from a particular social media source. Consider an example where the brand monitoring platform processes social media information related to a brand and competing brands in a banking industry for a particular month. The brand monitoring platform computes measures corresponding to each of the audience score metric parameters, for example, "number of fans" and "fan growth". The intermediate steps performed by the brand monitoring platform for normalizing each of the measures corresponding to each of the audience score metric parameters are disclosed in the detailed description of FIG. 13. The weights assigned to the audience score metric parameters "number of fans" and "fan growth" are represented in columns labeled as "fan weight" and "fan growth weight" respectively in the table exemplarily illustrated in FIG. 10A. The brand monitoring platform determines the audience score based on a weighted average of the normalized measures corresponding to each of the audience score metric parameters.

FIG. 10B exemplarily illustrates a table displaying results of a computation of an engagement score for each of multiple brands in an industry using social media information acquired from a particular social media source. In this example, the brand monitoring platform processes social media information related to a brand and competing brands in a banking industry. The brand monitoring platform computes measures corresponding to each of the engagement score metric parameters, for example, "engagement number", "number of administrator posts", "percentage of fan posts", and "net sentiment". The intermediate steps performed by the brand monitoring platform for normalizing each of the measures corresponding to each of the engagement score metric parameters are disclosed in the detailed description of FIG. 13. The weights assigned to the engagement score metric parameters "engagement number", "number of administrator posts", "percentage of fan posts", and "net sentiment" are represented in columns labeled as "engagement number weight", "administrator posts weight", "fan post weight", and "net sentiment weight" respectively in the table exemplarily illustrated in FIG. 10B. The brand monitoring platform determines the engagement score based on a weighted average of the normalized measures corresponding to each of the engagement score metric parameters.

FIG. 10C exemplarily illustrates a table displaying results of a computation of an aggregate score for each of multiple brands in an industry. The brand monitoring platform retrieves the audience score and the engagement score determined for each of the brands, for example, from database tables exemplarily illustrated in FIG. 10A and FIG. 10B respectively, and normalizes each of the audience scores and the engagement scores, as disclosed in the detailed description of FIGS. 1A-1B and FIG. 13. Furthermore, the brand monitoring platform assigns a normalized audience score rank and a normalized engagement score rank to each of the brands based on the normalized audience score and the normalized engagement score respectively. The normalized audience score rank and the normalized engagement score rank allow ranking of the brands in a particular industry. The brand monitoring platform assigns a separate rank for the audience score and the engagement score of each of the brands for analyzing how the brands have performed individually with reference to their quantitative scores against their qualitative scores respectively. Assigning a separate normalized audience score rank and a normalized engagement score rank for each of the brands by the brand monitoring platform enables analysis of strengths and weaknesses of each of the brands and suggests areas for improvement. The brand monitoring platform then generates an aggregate score by computing a weighted average of the normalized audience score and the normalized engagement score, normalizes the generated aggregate score, and assigns a brand rank to each of the brands.

FIGS. 11A-11B exemplarily illustrate screenshots of a graphical user interface (GUI) provided by the brand monitoring platform, displaying aggregate scores generated for multiple brands in particular industries. FIG. 11A exemplarily illustrates normalized aggregate scores generated by the brand monitoring platform for brands in an aviation industry. The brand monitoring platform provides a drop down menu on the GUI for selecting a geographical location within which an aggregate reach of the brand is to be determined. As exemplarily illustrated in FIG. 11A, the brand monitoring platform generates a normalized aggregate score of 100 for KLM Airlines, a normalized aggregate score of 94 for Lufthansa Airlines®, a normalized aggregate score of 91 for Turkish Airlines®, a normalized aggregate score of 86 for Air France®, a normalized aggregate score of 85 for Southwest Airlines®, a normalized aggregate score of 79 for Jet Airways®, etc.

FIG. 11B exemplarily illustrates normalized aggregate scores generated for brands in a food/beverage industry. As exemplarily illustrated in FIG. 11B, the brand monitoring platform generates a normalized aggregate score of 100 for Red Bull®, a normalized aggregate score of 98 for Coca-Cola®, a normalized aggregate score of 91 for Oreo®, a normalized aggregate score of 87 for Dr Pepper®, a normalized aggregate score of 85 for Pringles®, a normalized aggregate score of 84 for Nutella®, etc.

For each of the brands exemplarily illustrated in FIGS. 11A-11B, the brand monitoring platform uses metric parameters, for example, "number of likes" and "growth in the number of likes" during the generation of the aggregate score for each of the brands. The brand monitoring platform accounts for the geographical locations where each of the brands is focused by normalizing the aggregate reach of the brand based on geography. The brand monitoring platform displays the aggregate scores of each of the brands for a particular month and allows a user to select other months on the GUI to view the aggregate scores of each of the brands for the other months.

Figure 12:
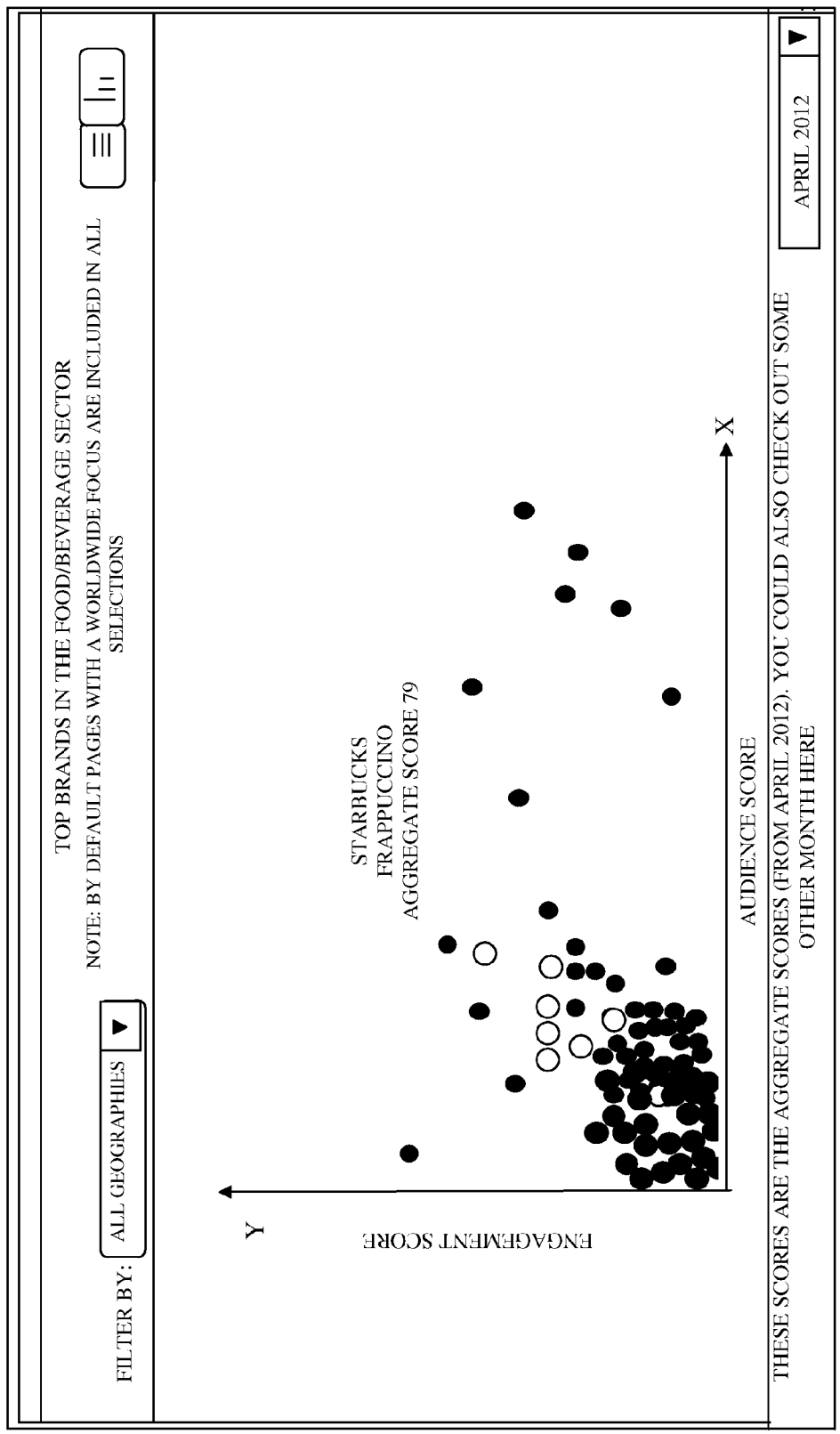
FIG. 12 exemplarily illustrates a screenshot of a graphical user interface provided by the brand monitoring platform displaying a graphical representation of a comparative analysis of an audience score against an engagement score for each of multiple brands in a particular industry.

FIG. 12 exemplarily illustrates a screenshot of a graphical user interface (GUI) provided by the brand monitoring platform displaying a graphical representation of a comparative analysis of an audience score against an engagement score for each of multiple brands in a particular industry. The graphical representation of the comparative analysis exemplarily illustrated in FIG. 12 is a scatter plot with an X axis representing the audience score and a Y axis representing the engagement score. The brand monitoring platform provides an analysis of the performance of a brand in obtaining an audience against the performance of the brand in engaging the audience. This comparative analysis allows each of the brands to analyze their relative marketing strengths and weaknesses.

FIG. 13 exemplarily illustrates a flowchart comprising the steps for benchmarking a brand based on the social media strength of the brand in a particular industry. Consider an example where an airline brand "ABC" requests the brand monitoring platform for benchmarking in the airlines industry. The brand monitoring platform identifies competing airline brands, for example, KLM, Lufthansa®, Amsterdam Airport Schiphol®, Southwest Airlines®, Turkish Airlines®, AirAsia®, Jet Airways®, Air France®, British Airways®, JetBlue Airways®, Cebu Pacific Air, Vueling People!, Malaysia Airlines®, Alitalia®, Philippine Airlines, United Airlines®, FlySpiceJet, Qatar Airways®, and Delta Air® Lines. Consider an example where the brand monitoring platform considers the following competing brands: KLM Airlines, Lufthansa Airlines®, and SouthWest Airlines®. The brand monitoring platform retrieves 1301 statistical data for audience score metric parameters and engagement score metric parameters from a corresponding application programming interface (API) configured for each of the social media sources as disclosed in the detailed description of FIGS. 1A-1B. In this example, the brand monitoring platform uses the following statistical data related to audience score metric parameters for the month of March from an API configured for a social media source such as Facebook®:

Number of fans: KLM—1,335,185, Lufthansa—935,408, SouthWest Airlines—2,158,217.
Growth of fans: KLM—237,793, Lufthansa—110,971, SouthWest Airlines—102,367
Number of "People Talking About": KLM—64,837, Lufthansa—33,834, SouthWest Airlines—33,118
Growth of "People Talking About": KLM—−11530, Lufthansa—−11506, SouthWest Airlines—−5927

Furthermore, the brand monitoring platform uses the following statistical data related to engagement score metric parameters for the month of March:
KLM (Number of administrator posts—26, with 85,602 likes, 9630 comments and 7568 shares);
Lufthansa—(Number of administrator posts—37, with 39,660 likes, 3459 comments and 3830 shares);
SouthWest Airlines (Number of administrator posts—21, with 20,941 likes, 4501 comments and 1458 shares)

Based on the measures of the engagement score metric parameters, the brand monitoring platform generates the following engagement number for each of the competing brands:
KLM—85, Lufthansa—34, SouthWest Airlines—20

Furthermore, the brand monitoring platform tracks the growth of the engagement number as:
KLM—36, Lufthansa—−11, SouthWest Airlines—3

The brand monitoring platform evaluates the other engagement score metric parameters, for example:
Number of posts as: KLM—2290 (26 administrator posts and 2264 fan posts), Lufthansa—1030 (37 administrator posts and 993 fan posts), SouthWest Airlines—2150 (21 administrator posts and 2129 fan posts)
Growth of posts: KLM—−1437 (2 administrator posts and −1439 fan posts), Lufthansa—−34 (−13 administrator posts and −21 fan posts), SouthWest Airlines—−1070 (−9 administrator posts and −1061 fan posts)

The brand monitoring platform counts the number of posts tagged manually in one or more dynamically generated categories for each of the brands as:
KLM—26 (21 brand related posts, 2 industry related posts, 2 current affairs related posts, 1 other post)
Lufthansa—37 (25 brand related posts, 6 industry related posts, 1 current affairs related post, 1 other post)
SouthWest Airlines—21 (20 administrator posts, 1 industry related post)

The brand monitoring platform tracks the growth of posts in the brand category as:
KLM—+5 Brand posts, Lufthansa—−1 Brand post, SouthWest Airlines—−9 Brand posts The brand monitoring platform tracks the number of posts ordered according to the sentiment of the posts as:
KLM—2286 (635 positive, 113 negative, 1538 neutral posts), Lufthansa—1027 (205 positive, 53 negative, 769 neutral posts), SouthWest Airlines—2142 (866 positive, 171 negative, 1105 neutral posts)

The brand monitoring platform computes the number of posts that have a positive sentiment or a negative sentiment. The number of posts with a positive sentiment and a negative sentiment are used to calculate intermediate measures. For example, an intermediate measure of the metric parameter, net sentiment, is computed as:

Net sentiment=positive sentiment−negative sentiment.

The brand monitoring platform assigns equal weights to both positive sentiments and negative sentiments. The brand monitoring platform shifts the net sentiment to ensure that differential values are positive. The brand monitoring platform then normalizes the net sentiment, for example, by normalizing the variance in the net sentiment to ensure that the measure of the metric parameter is in line with the other measures.

The brand monitoring platform determines the growth in the number of posts ordered according to the sentiment of the posts as follows:
KLM—1441 (−541 positive, −103 negative), Lufthansa—−37 (−18 positive, 11 negative), SouthWest Airlines—1078 (−307 positive, −87 negative)

The brand monitoring platform normalizes 1302 the statistical data for each of the metric parameters, that is, the audience score metric parameters and the engagement score metric parameters to reduce statistical differences and outlier data. The brand monitoring platform normalizes measures corresponding to each of the metric parameters by calculating statistics based on the metric parameters of all the brands. For example, the brand monitoring platform determines a median value for the audience score metric parameter "number of fans" to normalize the number of fans to a standard value. Furthermore, the brand monitoring platform computes an inter-quartile range to normalize standard deviations. The brand monitoring platform performs a sequence of steps as follows: The brand monitoring platform computes the relevant measures, for example, a percentage growth of fans. The brand monitoring platform then computes intermediate values for normalization of the measures of one or more audience score metric parameters and engagement score metric parameters. For example, the brand monitoring platform computes a square root of the number of fans in order to reduce spread of a measure between extreme values.

The brand monitoring platform then normalizes 1303 the statistical data for each of the metric parameters, that is, the audience score metric parameters and/or the engagement score metric parameters according to the geographical locations of the brands. In this example, the brand monitoring platform normalizes the measures of one or more audience score metric parameters and/or one or more engagement score metric parameters that vary according to the geographical location of the brand such that the median value of the measures for a particular audience score metric parameter or a particular engagement score metric parameter for the brand is 100. The brand monitoring platform normalizes the other measures such that the median value is 100. The brand monitoring platform normalizes geography specific metric parameters according to the geographical location and reach of the brand in the particular geographical location. For example, for the metric parameters that are geography specific, the brand monitoring platform normalizes the measures corresponding to each of the metric parameters for the brands in the Asia Pacific region, the North America region, the Europe region, etc., separately. The brand monitoring platform tapers extreme values of measures recorded for each of the audience score metric parameters and/or the engagement score metric parameters. For example, the brand monitoring platform tapers values that are three times an inter-quartile range more than a third quartile. These values are tapered to be a maximum of double the value.

Consider an example where the brand monitoring platform considers the "number of fans" metric parameter. The brand monitoring platform normalizes the measures corresponding to this metric parameter by first applying a square root of each of the measures for this metric parameter to obtain a new statistical distribution. The normalized measure, that is, the square root of the measure for the "number of fans" metric parameter derived from the original measure is known as an intermediate value. The brand monitoring platform then computes a mean value of the new statistical distribution as 172.15, the standard deviation as 138.63, the inter-quartile range as 121.3, and the third quartile as 189.6. The brand monitoring platform tapers the measures based on a threshold value that is derived as: (189.6+3*121.3=553.5) to a maximum value of 1107. Therefore, extreme values of the normalized measures of each of the brands corresponding to the "number of fans" metric parameter that exceed the threshold value 553.5 by a large value are tapered to 1107. The brand monitoring platform normalizes the measures that exceed the threshold value of 553.5 by a small value, for example, to a measure closer to or equal to 553.5.

The brand monitoring platform normalizes the individual measures of each of the brands corresponding to the "number of fans" metric parameter as follows:

KLM Airlines—532.1501

The brand monitoring platform computes the square root of the measure of the number of fans for KLM Airlines as: √1335185=1155.502. The brand monitoring platform then normalizes the intermediate value, that is, the square root of the measure of the number of fans, using the median value, the standard deviation value, and the threshold value derived for the complete statistical distribution taken from the above description as: 1155.502/1.7215=671.2181, 172.15+(671.2181−172.15)/1.3863=532.1501. Since this normalized measure of 532.1501 does not exceed the threshold computed for the distribution, the brand monitoring platform does not taper this measure.

Lufthansa Airlines—453.233

The brand monitoring platform computes the square root of the measure of the number of fans for Lufthansa Airlines as: √935408=967.1649. The brand monitoring platform then normalizes the intermediate value, that is, the square root of the measure of the number of fans, using the median value, the standard deviation value and the threshold value derived for the complete statistical distribution taken from the above description as: 967.1649, 967.1649/1.7215=561.815, 172.15+(561.815−172.15)/1.3863=453.233. Since this normalized measure of 453.233 does not exceed the threshold value computed for the distribution, the brand monitoring platform does not taper this measure.

SouthWest Airlines—580.483

The brand monitoring platform computes the square root of the measure of the number of fans for Lufthansa Airlines as: √2158217=1469.087. The brand monitoring platform then normalizes the intermediate value, that is, the square root of the measure of the number of fans, using the median value, the standard deviation value and the threshold value derived for the complete statistical distribution taken from the above description as: 1469.087/1.7215=853.376, 172.15+(853.376−172.15)/1.3863=663.549. Since this normalized measure of 663.549 exceeds the threshold value computed for the distribution, the brand monitoring platform tapers this measure to a measure closer to the threshold value, for example, 580.483.

The brand monitoring platform then normalizes the measures corresponding to one or more audience score metric parameters and/or one or more engagement score metric parameters such that the standard deviation is 100. Subsequent to performing the computational steps detailed above for the other audience score metric parameters and engagement score metric parameters, the brand monitoring platform obtains the following normalized results:
Growth of fans: KLM—243.5084, Lufthansa—180.0342, SouthWest Airlines—87.5184
Number of "People Talking About": KLM—480.2132, Lufthansa—293.9322, SouthWest Airlines—292.8419

Growth of "People Talking About": KLM—38.1762, Lufthansa—37.0217, SouthWest Airlines—87.4053
Engagement number: KLM—169.4406, Lufthansa—80.4079, SouthWest Airlines—84.3358
Growth of engagement number: KLM—318.2043, Lufthansa—79.3501, SouthWest Airlines—162.1752
Number of administrator posts: KLM—587.5118, Lufthansa—602.3587, SouthWest Airlines—264.1188
Percentage of fan posts: KLM—218.8007, Lufthansa—211.1232, SouthWest Airlines—291.5611
Number of posts in a manual category: KLM—219.9026, Lufthansa—152.2517, SouthWest Airlines—312.2309
Net positive posts by sentiment: KLM—269.0621, Lufthansa—192.0146, SouthWest Airlines—104.8804

The brand monitoring platform determines 1304 an audience score for each brand using a weighted average of the normalized measures of the audience score metric parameters. The audience score metric parameters comprise the quantitative metrics. The brand monitoring platform assigns weights to the audience score metric parameters based on the industry. In this example, the brand monitoring platform assigns weights to the audience score metric parameters as follows:
Number of fans—65%, Growth of fans—20%, Number of social media users discussing the brand, referred to as "Talking About This" —10%, Growth in "Talking About This" —5%

The brand monitoring platform therefore determines the audience score for KLM as: 0.65×532.1501+0.20×243.5084+0.1×480.2132+0.05×38.1762=444.529

The brand monitoring platform determines the audience score for Lufthansa Airlines and SouthWest Airlines as:
Lufthansa—361.852 (computed as 0.65×453.233+0.20×180.0342+0.1×293.9322+0.05×37.0217=361.852)
SouthWest Airlines—428.472 (computed as 0.65×580.483+0.20×87.5184+0.1×292.8419+0.05×87.4053=428.46)

The brand monitoring platform determines 1305 an engagement score for each brand using a weighted average of the normalized measures of the engagement score metric parameters, that is, the qualitative metrics. In this example, the brand monitoring platform assigns the following weights to the engagement score metric parameters for determining the engagement score: 35% for the engagement number, 15% for growth in the engagement number, 20% for the number of administrator posts, 5% for percentage of fan posts, 15% for number of posts manually sorted into the dynamically generated categories, and 10% for net positive sentiment.

The brand monitoring platform obtains the engagement score for each of the brands as follows:
For KLM Airlines, the engagement score is 295.3688. (0.35×169.4406+0.15×318.2043+0.20×587.5118+0.05×218.8007+0.15×219.9026+0.1×269.0621=295.3688)
For Lufthansa Airlines, the engagement score is 213.1123. (0.35×80.4079+0.15×79.3501+0.20×602.3587+0.05×211.1232+0.15×152.2517+0.1×192.0146=213.1123)
For SouthWest Airlines, the engagement score is 178.5683 (0.35×84.3358+0.15×162.1752+0.20×264.1188+0.05×291.5611+0.15×312.2309+0.1×104.8804=178.5683)

The brand monitoring platform normalizes 1306 the audience score and the engagement score such that the mean and the variance for each of the audience score and the engagement score is the same. Therefore, the brand monitoring platform determines the normalized audience score for each of the brands as follows:
KLM—537.332 (444.529/0.848=524.209, 84.8+(524.209−84.8)/0.971=537.332)
Lufthansa—436.924 (361.852/0.848=426.712, 84.8+(426.712−84.8)/0.971=436.924)
SouthWest Airlines—517.832 (428.472/0.848=505.274, 84.8+(505.274−84.8)/0.971=517.832)

The mean value for the normalized distribution for the engagement score across different brands, in this example, is 113, and the standard deviation for the normalized distribution for the engagement score is 91.7. The brand monitoring platform determines the engagement score for each of the brands as follows:
KLM Airlines—274.8193 (295.3688/1.13=261.3883, 113+(261.3883−113)/0.917=274.8193)
Lufthansa Airlines—195.4373 (213.1123/1.13=188.595, 113+(188.595−113)/0.917=195.4373)
SouthWest Airlines—162.1004 (178.5683/1.13=158.025, 113+(158.025−113)/0.917=162.1003)

The brand monitoring platform generates 1307 an aggregate score as the weighted average of the audience score and the engagement score. In this example, the weighs assigned to the audience score and the engagement score are equal. Therefore, the aggregate score for each of the brands is computed as follows:
KLM Airlines—406.076 ((537.3326+274.8193)/2),
Lufthansa Airlines—316.1809 ((436.9245+195.4373)/2)
SouthWest Airlines—339.966 ((517.832+162.1004)/2)

The brand monitoring platform normalizes the aggregate score between 0 and 100. On normalizing the aggregate score, the brand monitoring platform obtains the following values:
Aggregate score for KLM—100 (406.076*100/406.076=100)
Aggregate score for Lufthansa Airlines—78 (316.1809*100/406.076=78)
Aggregate score for SouthWest Airlines—84 (339.966*100/406.076=84)

The brand monitoring platform assigns 1307 a rank to each of the three airline brands as:
KLM—1, Lufthansa—3, SouthWest Airlines—2

Similarly, the brand monitoring platform performs the steps 1301 to 1307 for the airline brand "ABC" and benchmarks the airline brand ABC in the airlines industry based on the social media strength of the brand ABC in comparison with the competing brands, for example, KLM, Lufthansa, and SouthWest Airlines in the virtual social media environment.

Figure 14:
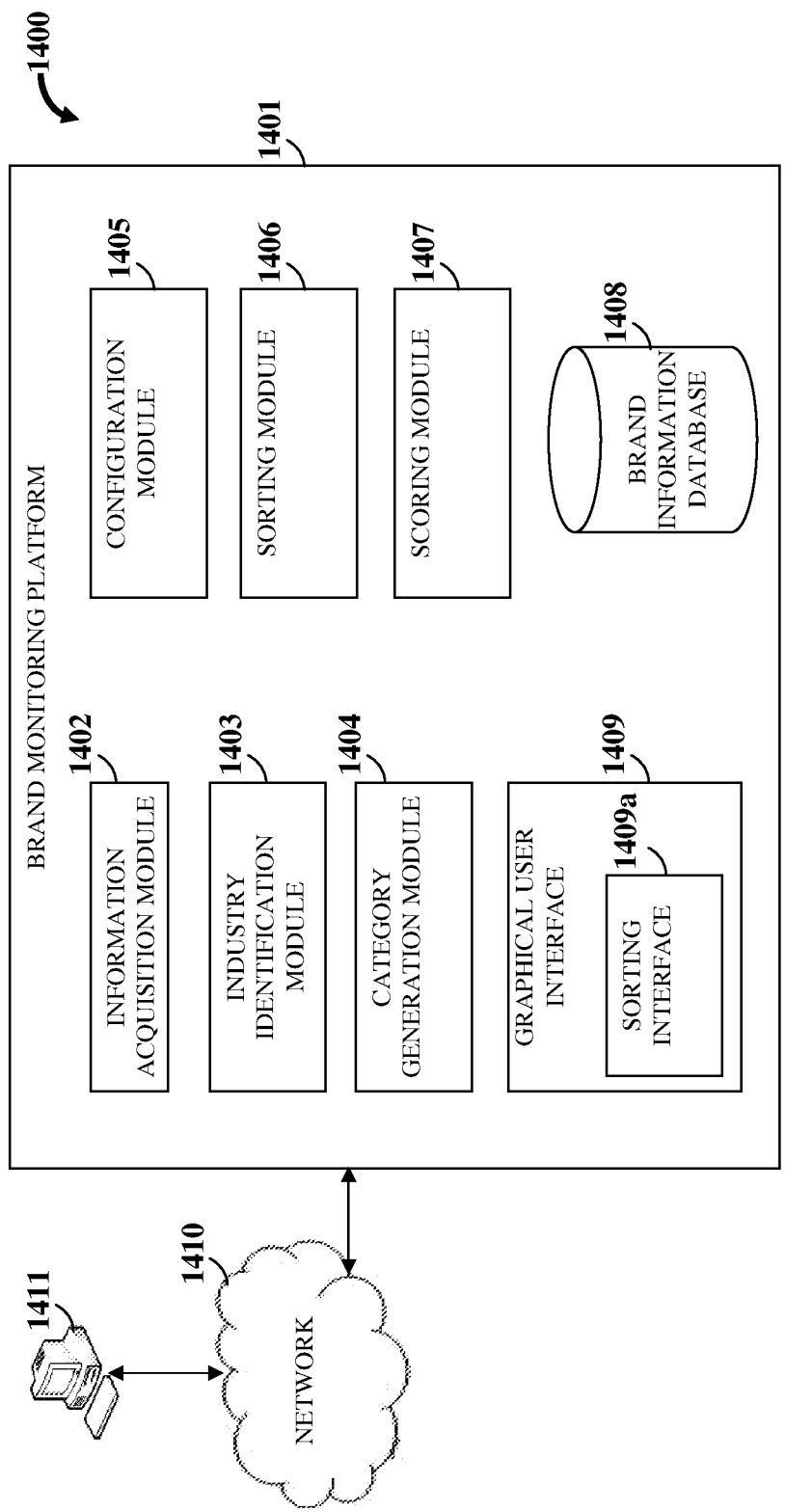
FIG. 14 illustrates a computer implemented system for benchmarking a brand based on the social media strength of the brand.

FIG. 14 illustrates a computer implemented system 1400 for benchmarking a brand based on the social media strength of the brand. The computer implemented system 1400 disclosed herein comprises a brand monitoring platform 1401 accessible by a computing device 1411 via a network 1410. The brand monitoring platform 1401 comprises at least one processor configured to execute modules 1402, 1403, 1404, 1405, 1406, 1407, 1409, etc., of the brand monitoring platform 1401 for monitoring the brand in a virtual social media environment. The brand monitoring platform 1401 is, for example, hosted on a server that is accessible via the network 1410. In an embodiment, the brand monitoring platform 1401 provides a web application or a mobile application that can be installed on a computing device 1411 by a user. The computing device 1411 is, for example, a laptop, a tablet computer, a mobile phone, a personal computer, a personal digital assistant, etc.

The brand monitoring platform 1401 comprises an information acquisition module 1402, an industry identification module 1403, a category generation module 1404, a sorting module 1406, a scoring module 1407, a configuration module 1405, and a brand information database 1408. Furthermore, the brand monitoring platform 1401 provides a graphical user interface (GUI) 1409 for acquiring input information on a brand, for acquiring categories from one or more users for sorting social media information acquired from one or more social media sources, for displaying an aggregate score and a brand rank received by a particular brand in relation to all the competing brands in a particular industry, etc. The GUI 1409 comprises a set of web pages hosted on a server associated with the brand monitoring platform 1401.

The information acquisition module 1402 acquires input information on the brand, for example, from one or more online resources, inputs provided by the user via the GUI 1409, etc. The industry identification module 1403 identifies industries related to the brand and competing brands in the identified industries using the acquired input information on the brand. The information acquisition module 1402 acquires social media information related to the brand and the competing brands in the identified industries from multiple social media sources in the virtual social media environment via a network 1410. The network 1410 is, for example, the internet, an intranet, a local area network, a wide area network, a communication network implementing WiFi® of the Wireless Ethernet Compatibility Alliance, Inc., a cellular network, a mobile communication network such as a global system for mobile communications (GSM) network, a general packet radio service (GPRS) network, etc.

The category generation module 1404 dynamically generates categories, for example, a location of each of the identified industries related to the brand and each of the competing brands, a location of each of multiple authors of the social media information, types of social media sources utilized by the brand and each of the competing brands, marketing elements, etc., in one or more hierarchical levels in each of the identified industries based on an independent analysis of the acquired social media information related to the brand and the competing brands from each of the social media sources. In an embodiment, the category generation module 1404 determines clusters of similar content portions from the acquired social media information and identifies one or more common categories applicable to the brand and each of the competing brands in each of the identified industries from the determined clusters of the similar content portions during the independent analysis of the acquired social media information related to the brand and the competing brands from each of the social media sources for the dynamic generation of the categories.

The sorting module 1406 sorts the acquired social media information related to the brand and the competing brands in each of the identified industries into one or more dynamically generated categories in one or more of the hierarchical levels using a sorting interface 1409a. The sorting interface 1409a is hosted on the GUI 1409. In an embodiment, the sorting module 1406 acquires inputs for sorting of the acquired social media information related to the brand and the competing brands in each of the identified industries into one or more of the dynamically generated categories in one or more hierarchical levels from a user via the sorting interface 1409a.

The configuration module 1405 configures one or more of the weighted audience score metric parameters and one or more of the weighted engagement score metric parameters for determination of the audience score and the engagement score respectively, based on predetermined criteria. The scoring module 1407 determines an audience score for the brand and each of the competing brands by measuring an aggregate reach of the brand and each of the competing brands in the virtual social media environment based on one or more of multiple weighted audience score metric parameters using the sorted social media information as disclosed in the detailed description of FIGS. 1A-1B and FIG. 6. In an embodiment, the scoring module 1407 normalizes measures corresponding to each of the audience score metric parameters. The scoring module 1407 assigns individual weights to the audience score metric parameters. The scoring module 1407 determines a weighted average of the normalized measures corresponding to each of the audience score metric parameters using the assigned individual weights for determination of the audience score for the brand and each of the competing brands.

The scoring module 1407 determines an engagement score for the brand and each of the competing brands by measuring interaction between the brand and each of the competing brands with their corresponding followers based on one or more of multiple weighted engagement score metric parameters using the sorted social media information as disclosed in the detailed description of FIGS. 1A-1B and FIG. 7. In an embodiment, the scoring module 1407 determines the engagement score for the brand and each of the competing brands by normalizing measures corresponding to each of the engagement score metric parameters. The scoring module 1407 assigns individual weights to the engagement score metric parameters. The scoring module 1407 determines a weighted average of the normalized measures corresponding to each of the engagement score metric parameters using the assigned individual weights for the determination of the engagement score for the brand and each of the competing brands.

In an embodiment, the scoring module 1407 normalizes measures corresponding to one or more audience score metric parameters and one or more engagement score metric parameters, based on a location of each of the identified industries related to the brand and each of the competing brands during the determination of the audience score and said engagement score respectively, for the brand and each of the competing brands, for reducing statistical differences in the measures triggered by a difference of the location of each of the identified industries related to the brand and the competing brands. In an embodiment, the scoring module 1407 normalizes measures corresponding to each of the weighted audience score metric parameters for removing statistical differences between extreme measures corresponding to each of the weighted audience score metric parameters, and for reducing outlier data. In an embodiment, the scoring module 1407 normalizes measures corresponding to each of the weighted engagement score metric parameters for removing statistical differences between extreme measures corresponding to each of the weighted engagement score metric parameters, and for reducing outlier data.

The scoring module 1407 generates an aggregate score for the brand and each of the competing brands using the determined audience score and the determined engagement score. In an embodiment, the scoring module 1407 generates the aggregate score for the brand and each of the competing brands by determining a weighted average of the determined audience score and the determined engagement score. Furthermore, the scoring module 1407 assigns a rank to the brand and each of the competing brands based on the aggregate score for benchmarking the brand based on the social media strength of the brand in comparison with the competing brands in the virtual social media environment. The brand information database 1408 is, for example, a component of a relational database management system that stores the input information on the brands, the social media information acquired from multiple social media sources, statistical information mapped to audience score metric parameters and engagement score metric parameters, the audience score and the engagement score for each of the brands across multiple industries, the aggregate score and the brand rank of each of the brands, etc. In an embodiment, the brand monitoring platform 1401 periodically tracks and updates changes to the social media information in the brand information database 1408, and updates the aggregate score and the brand rank for each of the brands in a particular industry and/or in a particular geographical location.

Figure 15:
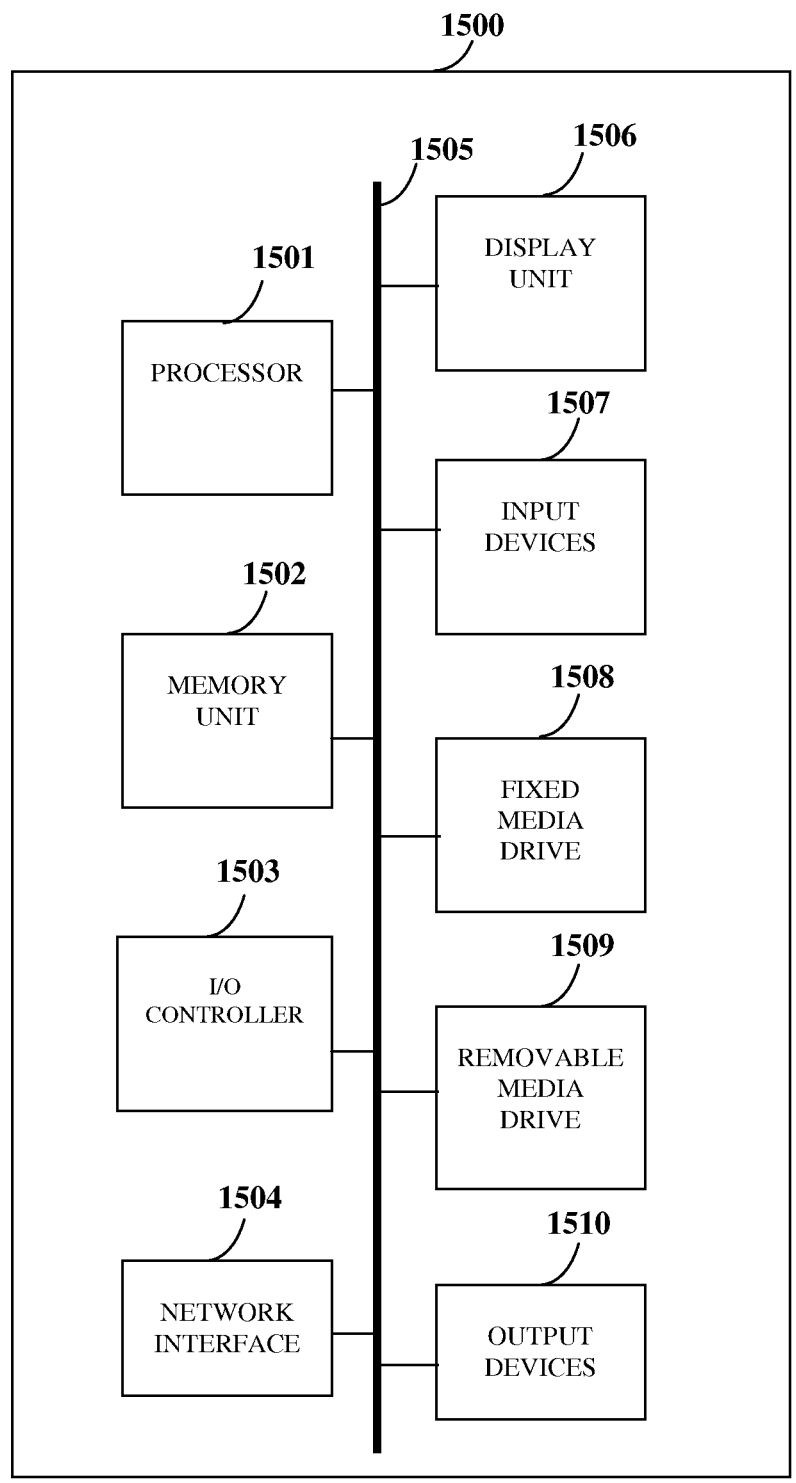
FIG. 15 exemplarily illustrates the architecture of a computer system employed by the brand monitoring platform for benchmarking a brand based on the social media strength of the brand.

FIG. 15 exemplarily illustrates the architecture of a computer system 1500 employed by the brand monitoring platform 1401 for benchmarking a brand based on the social media strength of the brand. The brand monitoring platform 1401 of the computer implemented system 1400 exemplarily illustrated in FIG. 14 employs the architecture of the computer system 1500 exemplarily illustrated in FIG. 15.

The brand monitoring platform 1401 communicates with a computing device 1411 of a user authorized to update the brand information database 1408 in the brand monitoring platform 1401 via a network 1410. The network 1410 is, for example, a short range network or a long range network. The network 1410 is, for example, the internet, a local area network, a wide area network, a wireless network, a mobile communication network, etc. The computer system 1500 comprises, for example, a processor 1501, a memory unit 1502 for storing programs and data, an input/output (I/O) controller 1503, a network interface 1504, a data bus 1505, a display unit 1506, input devices 1507, a fixed media drive 1508, a removable media drive 1509 for receiving removable media, output devices 1510, etc.

The processor 1501 is an electronic circuit that executes computer programs. The memory unit 1502 is used for storing computer programs, applications, and data. For example, the information acquisition module 1402, the industry identification module 1403, the category generation module 1404, the sorting module 1406, the scoring module 1407, the configuration module 1405, etc., of the brand monitoring platform 1401 are stored in the memory unit 1502 of the computer system 1500 of the brand monitoring platform 1401. The memory unit 1502 is, for example, a random access memory (RAM) or another type of dynamic storage device that stores information and instructions for execution by the processor 1501. The memory unit 1502 also stores temporary variables and other intermediate information used during execution of instructions by the processor 1501. The computer system 1500 further comprises a read only memory (ROM) or another type of static storage device that stores static information and instructions for the processor 1501.

The network interface 1504 enables connection of the computer system 1500 to the network 1410. For example, the brand monitoring platform 1401 connects to the network 1410 via the network interface 1504. The network interface 1504 comprises, for example, an infrared (IR) interface, an interface implementing Wi-Fi® of the Wireless Ethernet Compatibility Alliance, Inc., a universal serial bus (USB) interface, a local area network (LAN) interface, a wide area network (WAN) interface, etc. The I/O controller 1503 controls input actions, for example, manual tagging actions, and output actions performed by the brand monitoring platform 1401. The data bus 1505 permits communications between the modules, for example, 1402, 1403, 1404, 1405, 1406, 1407, 1409, etc., of the brand monitoring platform 1401.

The display unit 1506 of the brand monitoring platform 1401, via the graphical user interface (GUI) 1409, displays information, for example, the aggregate score and the brand rank of a particular brand and each of the competing brands in an industry. Furthermore, the display unit 1506 of the brand monitoring platform 1401 displays the hierarchical levels of categories dynamically generated by the brand monitoring platform 1401 and sorting interfaces 1409*a* for manually tagging one or more posts from the social media information to the categories and sub-categories generated by the brand monitoring platform 1401. The input devices 1507 are used for inputting data into the computer system 1500. The user uses the input devices 1507 to provide inputs to the brand monitoring platform 1401. For example, a user may drag and drop a particular post collected as part of the social media information to one or more categories dynamically generated by the brand monitoring platform 1401 via the sorting interface 1409*a*. The input devices 1507 are, for example, a keyboard such as an alphanumeric keyboard, a joystick, a pointing device such as a computer mouse, a touch pad, a light pen, etc.

The output devices 1510 output the results of operations performed by the brand monitoring platform 1401. For example, the brand monitoring platform 1401 notifies changes to the aggregate score or the brand rank of each of the brands in a particular industry on receiving updates to the brand information over a predetermined duration of time, to all the brand owners and brand communities associated with each of the brands through a display notification on the GUI 1409 of the brand monitoring platform 1401.

Computer applications and computer programs are used for operating the computer system 1500. The computer programs are loaded onto the fixed media drive 1508 and into the memory unit 1502 of the computer system 1500 via the removable media drive 1509. In an embodiment, the computer applications and the computer programs may be loaded directly into the computer system 1500 via the network 1410. Computer applications and computer programs are executed by double clicking a related icon displayed on the display unit 1506 using one of the input devices 1507.

The computer system 1500 employs an operating system for performing multiple tasks. The operating system is responsible for management and coordination of activities and sharing of resources of the computer system 1500. The operating system further manages security of the computer system 1500, peripheral devices connected to the computer system 1500, and network connections. The operating system employed on the computer system 1500 recognizes, for example, inputs provided by a user using one of the input devices 1507, the output display, files, and directories stored locally on the fixed media drive 1508, for example, a hard drive. The operating system on the computer system 1500 executes different computer programs using the processor 1501.

The processor 1501 retrieves the instructions for executing the modules, for example, 1402, 1403, 1404, 1405, 1406, 1407, etc., of the brand monitoring platform 1401 from the memory unit 1502. A program counter determines the location of the instructions in the memory unit 1502. The program counter stores a number that identifies the current position in the computer program of each the modules, for example, 1402, 1403, 1404, 1405, 1406, 1407, etc., of the brand monitoring platform 1401.

The instructions fetched by the processor 1501 from the memory unit 1502 after being processed are decoded. The instructions are placed in an instruction register in the processor 1501. After processing and decoding, the processor 1501 executes the instructions. For example, the information acquisition module 1402 defines instructions for acquiring input information on the brand. The industry identification module 1403 defines instructions for identifying industries related to the brand and competing brands in the identified industries using the acquired input information on the brand.

The information acquisition module 1402 defines instructions for acquiring social media information related to the brand and the competing brands in the identified industries from multiple social media sources in the virtual social media environment via a network 1410.

The category generation module 1404 defines instructions for dynamically generating categories in one or more hierarchical levels in each of the identified industries based on an independent analysis of the acquired social media information related to the brand and competing brands from each of the social media sources. In an embodiment, the category generation module 1404 defines instructions for determining clusters of similar content portions from the acquired social media information and for identifying one or more common categories applicable to the brand and each of the competing brands in each of the identified industries from the determined clusters of similar content portions during the independent analysis of the acquired social media information related to the brand and the competing brands from each of the social media sources for dynamic generation of the categories.

The sorting module 1406 defines instructions for sorting the acquired social media information related to the brand and the competing brands in each of the identified industries into one or more dynamically generated categories in one or more hierarchical levels using the sorting interface 1409a. Furthermore, the sorting module 1406 defines instructions for acquiring inputs for sorting of the acquired social media information related to the brand and the competing brands in each of the identified industries into one or more of the dynamically generated categories in one or more hierarchical levels from a user via the sorting interface 1409a.

The configuration module 1405 defines instructions for configuring one or more weighted audience score metric parameters and one or more weighted engagement score metric parameters for the determination of the audience score and the engagement score respectively, based on predetermined criteria. The scoring module 1407 defines instructions for determining an audience score for the brand and each of the competing brands by measuring an aggregate reach of the brand and each of the competing brands in the virtual social media environment based on one or more weighted audience score metric parameters using the sorted social media information. Furthermore, the scoring module 1407 defines instructions for normalizing measures corresponding to each of the audience score metric parameters, for assigning individual weights to the audience score metric parameters, and for determining a weighted average of the normalized measures corresponding to each of the audience score metric parameters using the assigned individual weights for determining the audience score for the brand and each of the competing brands.

The scoring module 1407 defines instructions for determining an engagement score for the brand and each of the competing brands by measuring interaction between the brand and each of the competing brands and their followers based on one or more weighted engagement score metric parameters using the sorted social media information. The scoring module 1407 defines instructions for normalizing measures corresponding to each of the engagement score metric parameters, for assigning individual weights to the engagement score metric parameters, and for determining a weighted average of the normalized measures corresponding to each of the engagement score metric parameters using the assigned individual weights for determining the engagement score for the brand and each of the competing brands.

Furthermore, the scoring module 1407 defines instructions for normalizing measures corresponding to one or more audience score metric parameters and one or more engagement score metric parameters, based on a location of each of the identified industries related to the brand and each of the competing brands during the determination of the audience score and the engagement score respectively, for the brand and each of the competing brands, for reducing statistical differences in the measures triggered by a difference of the location of each of the identified industries related to the brand and each of the competing brands. The scoring module 1407 defines instructions for normalizing measures corresponding to each of the weighted audience score metric parameters for reducing statistical differences between extreme measures corresponding to each of the weighted audience score metric parameters and for reducing outlier data. The scoring module 1407 defines instructions for normalizing measures corresponding to each of the weighted engagement score metric parameters for reducing statistical differences between extreme measures corresponding to each of the weighted engagement score metric parameters and for reducing outlier data.

The scoring module 1407 defines instructions for generating an aggregate score for the brand and each of the competing brands using the determined audience score and the determined engagement score. The scoring module 1407 defines instructions for determining a weighted average of the determined audience score and the determined engagement score for generating the aggregate score for the brand and each of the competing brands. Furthermore, the scoring module 1407 defines instructions for assigning a rank to the brand and each of the competing brands based on the aggregate score for benchmarking of the brand based on the social media strength of the brand in comparison with the competing brands in the virtual social media environment.

The processor 1501 of the computer system 1500 employed by the brand monitoring platform 1401 retrieves the instructions defined by the information acquisition module 1402, the industry identification module 1403, the category generation module 1404, the sorting module 1406, the scoring module 1407, and the configuration module 1405 of the brand monitoring platform 1401, and executes the instructions. At the time of execution, the instructions stored in the instruction register are examined to determine the operations to be performed. The processor 1501 then performs the specified operations. The operations comprise arithmetic operations and logic operations. The operating system performs multiple routines for performing a number of tasks required to assign the input devices 1507, the output devices 1510, and memory for execution of the modules, for example, 1402, 1403, 1404, 1405, 1406, 1407, etc., of the brand monitoring platform 1401. The tasks performed by the operating system comprise, for example, assigning memory to the modules, for example, 1402, 1403, 1404, 1405, 1406, 1407, etc., of the brand monitoring platform 1401, and to data used by the brand monitoring platform 1401, moving data between the memory unit 1502 and disk units, and handling input/output operations. The operating system performs the tasks on request by the operations and after performing the tasks, the operating system transfers the execution control back to the processor 1501. The processor 1501 continues the execution to obtain one or more outputs. The outputs of the execution of the modules, for example, 1402, 1403, 1404, 1405, 1406, 1407, etc., of the brand monitoring platform 1401 are displayed to the user on the display unit 1506.

For purposes of illustration, the detailed description refers to the brand monitoring platform 1401 being run locally on a computer system 1500; however the scope of the computer implemented method and system 1400 disclosed herein is not limited to the brand monitoring platform 1401 being run locally on the computer system 1500 via the operating system and the processor 1501, but may be extended to run remotely over the network 1410 by employing a web browser and a remote server, a mobile phone, or other electronic devices.

Disclosed herein is also a computer program product comprising a non-transitory computer readable storage medium that stores computer program codes comprising instructions executable by at least one processor 1501 for benchmarking a brand based on the social media strength of the brand. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 1501, except for a transitory, propagating signal.

The computer program product disclosed herein comprises one or more computer program codes for benchmarking a brand based on the social media strength of the brand. The computer program codes comprise a first computer program code for acquiring input information on a brand; a second computer program code for identifying industries related to the brand and competing brands in the identified industries using the acquired input information on the brand; a third computer program code for acquiring social media information related to the brand and the competing brands in the identified industries from multiple social media sources in the virtual social media environment via a network 1410; a fourth computer program code for dynamically generating categories in one or more hierarchical levels in each of the identified industries based on an independent analysis of the acquired social media information related to the brand and the competing brands from each of the social media sources; a fifth computer program code for sorting the acquired social media information related to the brand and the competing brands in each of the identified industries into one or more of the dynamically generated categories in one or more hierarchical levels using the sorting interface 1409a; a sixth computer program code for determining an audience score for the brand and each of the competing brands by measuring an aggregate reach of the brand and each of the competing brands in the virtual social media environment based on one or more of multiple weighted audience score metric parameters using the sorted social media information; a seventh computer program code for determining an engagement score for the brand and each of the competing brands by measuring interaction between the brand and each of the competing brands and their corresponding followers based on one or more of multiple weighted engagement score metric parameters using the sorted social media information; and an eighth computer program code for generating an aggregate score for the brand and each of the competing brands using the determined audience score and the determined engagement score. The computer program product disclosed herein further comprises additional computer program codes for performing additional steps that may be required and contemplated for benchmarking the brand based on the social media strength of the brand. In an embodiment, a single piece of computer program code comprising computer executable instructions performs one or more steps of the computer implemented method disclosed herein for benchmarking the brand based on the social media strength of the brand.

The computer program codes comprising computer executable instructions are embodied on the non-transitory computer readable storage medium. The processor 1501 of the computer system 1500 retrieves these computer executable instructions and executes them. When the computer executable instructions are executed by the processor 1501, the computer executable instructions cause the processor 1501 to perform the steps of the computer implemented method for benchmarking the brand based on the social media strength of the brand in comparison with the competing brands in the virtual social media environment.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the brand information database 1408, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:
1. A computer implemented method for benchmarking a brand based on social media strength of said brand, comprising:
providing a brand monitoring platform comprising at least one processor configured to monitor said brand in a virtual social media environment;
acquiring input information on said brand by said brand monitoring platform;
identifying industries related to said brand and competing brands in said identified industries using said acquired input information on said brand by said brand monitoring platform;
acquiring social media information related to said brand and said competing brands in said identified industries from a plurality of social media sources in said virtual social media environment by said brand monitoring platform via a network;
dynamically generating categories in one or more hierarchical levels in each of said identified industries by said brand monitoring platform based on an independent analysis of said acquired social media information related to said brand and said competing brands from each of said social media sources;
sorting said acquired social media information related to said brand and said competing brands in said each of said identified industries into one or more of said dynamically generated categories in said one or more hierarchical levels by said brand monitoring platform using a sorting interface provided by said brand monitoring platform;
determining an audience score for said brand and each of said competing brands by measuring an aggregate reach of said brand and said each of said competing brands in said virtual social media environment by said brand monitoring platform based on one or more of a plurality of weighted audience score metric parameters using said sorted social media information;
determining an engagement score for said brand and said each of said competing brands by measuring interaction between said brand and said each of said competing brands and their followers by said brand monitoring platform based on one or more of a plurality of weighted engagement score metric parameters using said sorted social media information;
generating an aggregate score for said brand and said each of said competing brands by said brand monitoring platform using said determined audience score and said determined engagement score; and
determining social media strength of said brand in comparison with said competing brands in said virtual social media environment by assigning a rank to said brand and said each of said competing brands by said brand monitoring platform based on said aggregate score;
whereby said brand is benchmarked in comparison with said competing brands in said virtual social media environment based on said social media strength of said brand in comparison with said competing brands in said virtual social media environment.

2. The computer implemented method of claim 1, wherein said dynamically generated categories comprise a location of each of said identified industries related to said brand and said each of said competing brands, a location of each of a plurality of authors of said social media information, types of said social media sources utilized by said brand and said each of said competing brands, and marketing elements.

3. The computer implemented method of claim 1, wherein said brand monitoring platform generates said aggregate score for said brand and said each of said competing brands by determining a weighted average of said determined audience score and said determined engagement score.

4. The computer implemented method of claim 1, wherein said weighted audience score metric parameters comprise a number of said followers of said brand and said each of said competing brands at said each of said social media sources, a rate of growth of said number of said followers of said brand and said each of said competing brands, a number of recommendations for said brand and said each of said competing brands at said each of said social media sources from each of said followers, a number of references made to said brand and said each of said competing brands at said each of said social media sources by said followers, and aggregate responses to one or more of products, services, and events associated with said brand and said each of said competing brands.

5. The computer implemented method of claim 1, wherein said weighted engagement score metric parameters comprise nature of responses to one or more brand actions of said brand and said each of said competing brands from each of said followers of said brand and said each of said competing brands, a number of brand notification messages, sentiments of said followers towards said brand and said each of said competing brands, a number of fan posts extracted from said acquired social media information, and relevance of said fan posts to said brand and said each of said competing brands.

6. The computer implemented method of claim 1, wherein said determination of said audience score for said brand and said each of said competing brands by said brand monitoring platform comprises:
   normalizing measures corresponding to each of said audience score metric parameters;
   assigning individual weights to said audience score metric parameters; and
   determining a weighted average of said normalized measures corresponding to said each of said audience score metric parameters using said assigned individual weights.

7. The computer implemented method of claim 1, wherein said determination of said engagement score for said brand and said each of said competing brands by said brand monitoring platform comprises:
   normalizing measures corresponding to each of said engagement score metric parameters;
   assigning individual weights to said engagement score metric parameters; and
   determining a weighted average of said normalized measures corresponding to said each of said engagement score metric parameters using said assigned individual weights.

8. The computer implemented method of claim 1, further comprising acquiring inputs for said sorting of said acquired social media information related to said brand and said competing brands in said each of said identified industries into said one or more of said dynamically generated categories in said one or more hierarchical levels by said brand monitoring platform from a user via said sorting interface.

9. The computer implemented method of claim 1, wherein said determination of said audience score and said engagement score for said brand and said each of said competing brands by said brand monitoring platform comprises normalizing measures corresponding to one or more of said audience score metric parameters and one or more of said engagement score metric parameters respectively, based on a location of each of said identified industries related to said brand and said each of said competing brands, for reducing statistical differences in said measures triggered by a difference of said location of said each of said identified industries related to said brand and said each of said competing brands.

10. The computer implemented method of claim 1, further comprising configuring one or more of said weighted audience score metric parameters and one or more of said weighted engagement score metric parameters for said determination of said audience score and said engagement score respectively, by said brand monitoring platform based on predetermined criteria.

11. The computer implemented method of claim 1, wherein said independent analysis of said acquired social media information related to said brand and said competing brands from said each of said social media sources for said dynamic generation of said categories by said brand monitoring platform comprises determining clusters of similar content portions from said acquired social media information and identifying one or more common categories applicable to said brand and said each of said competing brands in said each of said identified industries from said determined clusters of said similar content portions.

12. The computer implemented method of claim 1, further comprising normalizing measures corresponding to each of said weighted audience score metric parameters by said brand monitoring platform for reducing statistical differences between extreme said measures corresponding to said each of said weighted audience score parameters.

13. The computer implemented method of claim 1, further comprising normalizing measures corresponding to each of said weighted engagement score metric parameters by said brand monitoring platform for reducing statistical differences between extreme said measures corresponding to said each of said weighted engagement score parameters.

14. A computer implemented system for benchmarking a brand based on social media strength of said brand, comprising:
   a brand monitoring platform comprising at least one processor configured to execute modules of said brand monitoring platform for monitoring said brand in a virtual social media environment, said modules of said brand monitoring platform comprising:
   an information acquisition module that acquires input information on said brand;
   an industry identification module that identifies industries related to said brand and competing brands in said identified industries using said acquired input information on said brand;
   said information acquisition module that acquires social media information related to said brand and said competing brands in said identified industries from a plurality of social media sources in said virtual social media environment via a network;
   a category generation module that dynamically generates categories in one or more hierarchical levels in each of said identified industries based on an independent analysis of said acquired social media information related to said brand and said competing brands from each of said social media sources;
   a sorting module that sorts said acquired social media information related to said brand and said competing brands in said each of said identified industries into one or more of said dynamically generated categories in said one or more hierarchical levels using a sorting interface;
   a scoring module that determines an audience score for said brand and each of said competing brands by measuring an aggregate reach of said brand and said each of said competing brands in said virtual social media environment based on one or more of a plurality of weighted audience score metric parameters using said sorted social media information;
   said scoring module that determines an engagement score for said brand and said each of said competing brands by measuring interaction between said brand and said each of said competing brands and their followers based on one or more of a plurality of weighted engagement score metric parameters using said sorted social media information;
   said scoring module that generates an aggregate score for said brand and said each of said competing brands using said determined audience score and said determined engagement score; and said scoring module that determines said social media strength of said brand in comparison with said competing brands in said virtual social media environment by assigning a rank to said brand and said each of said competing brands based on said aggregate score for said benchmarking of said brand based on said social media strength of said brand in comparison with said competing brands in said virtual social media environment;

whereby said generated aggregate score of said brand and said each of said competing brands benchmarks said brand based on said social media strength of said brand in comparison with said competing brands in said virtual social media environment.

15. The computer implemented system of claim 14, wherein said dynamically generated categories comprise a location of each of said identified industries related to said brand and said each of said competing brands, a location of each of a plurality of authors of said social media information, types of said social media sources utilized by said brand and said each of said competing brands, and marketing elements.

16. The computer implemented system of claim 14, wherein said scoring module generates said aggregate score for said brand and said each of said competing brands by determining a weighted average of said determined audience score and said determined engagement score.

17. The computer implemented system of claim 14, wherein said weighted audience score metric parameters comprise a number of said followers of said brand and said each of said competing brands at said each of said social media sources, a rate of growth of said number of said followers of said brand and said each of said competing brands, a number of recommendations for said brand and said each of said competing brands at said each of said social media sources from each of said followers, a number of references made to said brand and said each of said competing brands at said each of said social media sources by said followers, and aggregate responses to one or more of products, services, and events associated with said brand and said each of said competing brands.

18. The computer implemented system of claim 14, wherein said weighted engagement score metric parameters comprise nature of responses to one or more brand actions of said brand and said each of said competing brands from each of said followers of said brand and said each of said competing brands, a number of brand notification messages, sentiments of said followers towards said brand and said each of said competing brands, a number of fan posts extracted from said acquired social media information, and relevance of said fan posts to said brand and said each of said competing brands.

19. The computer implemented system of claim 14, wherein said scoring module performs:

normalizing measures corresponding to each of said audience score metric parameters;

assigning individual weights to said audience score metric parameters; and determining a weighted average of said normalized measures corresponding to said each of said audience score metric parameters using said assigned individual weights for said determination of said audience score for said brand and said each of said competing brands.

20. The computer implemented system of claim 14, wherein said scoring module performs:

normalizing measures corresponding to each of said engagement score metric parameters;

assigning individual weights to said engagement score metric parameters; and determining a weighted average of said normalized measures corresponding to said each of said engagement score metric parameters using said assigned individual weights for said determination of said engagement score for said brand and said each of said competing brands.

21. The computer implemented system of claim 14, wherein said sorting module acquires inputs for said sorting of said acquired social media information related to said brand and said competing brands in said each of said identified industries into said one or more of said dynamically generated categories in said one or more hierarchical levels from a user via said sorting interface.

22. The computer implemented system of claim 14, wherein said scoring module normalizes measures corresponding to one or more of said audience score metric parameters and one or more of said engagement score metric parameters, based on a location of each of said identified industries related to said brand and said each of said competing brands during said determination of said audience score and said engagement score respectively, for said brand and said each of said competing brands, for reducing statistical differences in said measures triggered by a difference of said location of said each of said identified industries related to said brand and said each of said competing brands.

23. The computer implemented system of claim 14, wherein said modules of said brand monitoring platform further comprise a configuration module that configures one or more of said weighted audience score metric parameters and one or more of said weighted engagement score metric parameters for said determination of said audience score and said engagement score respectively, based on predetermined criteria.

24. The computer implemented system of claim 14, wherein said category generation module determines clusters of similar content portions from said acquired social media information and identifies one or more common categories applicable to said brand and said each of said competing brands in said each of said identified industries from said determined clusters of said similar content portions during said independent analysis of said acquired social media information related to said brand and said competing brands from said each of said social media sources for said dynamic generation of said categories.

25. The computer implemented system of claim 14, wherein said scoring module performs:

normalizing measures corresponding to each of said weighted audience score metric parameters for reducing statistical differences between extreme said measures corresponding to said each of said weighted audience score metric parameters; and normalizing measures corresponding to each of said weighted engagement score metric parameters for reducing statistical differences between extreme said measures corresponding to said each of said weighted engagement score metric parameters.

26. A computer program product comprising a non-transitory computer readable storage medium, said non-transitory computer readable storage medium storing computer program codes comprising instructions executable by at least one processor, said computer program codes comprising:

a first computer program code for acquiring input information on a brand;

a second computer program code for identifying industries related to said brand and competing brands in said identified industries using said acquired input information on said brand;

a third computer program code for acquiring social media information related to said brand and said competing brands in said identified industries from a plurality of social media sources in a virtual social media environment via a network;

a fourth computer program code for dynamically generating categories in one or more hierarchical levels in each of said identified industries based on an independent analysis of said acquired social media information related to said brand and said competing brands from each of said social media sources;

a fifth computer program code for sorting said acquired social media information related to said brand and said competing brands in said each of said identified industries into one or more of said dynamically generated categories in said one or more hierarchical levels using a sorting interface;

a sixth computer program code for determining an audience score for said brand and each of said competing brands by measuring an aggregate reach of said brand and said each of said competing brands in said virtual social media environment based on one or more of a plurality of weighted audience score metric parameters using said sorted social media information;

a seventh computer program code for determining an engagement score for said brand and said each of said competing brands by measuring interaction between said brand and said each of said competing brands and their followers based on one or more of a plurality of weighted engagement score metric parameters using said sorted social media information; and an eighth computer program code for generating an aggregate score for said brand and said each of said competing brands using said determined audience score and said determined engagement score, said eighth computer program code for determining social media strength of said brand in comparison with said competing brands in said virtual social media environment by assigning a rank to said brand and said each of said competing brands by said brand monitoring platform based on said aggregate score.

* * * * *